(12) United States Patent
Rossi et al.

(10) Patent No.: US 11,720,590 B2
(45) Date of Patent: Aug. 8, 2023

(54) PERSONALIZED VISUALIZATION RECOMMENDATION SYSTEM

(71) Applicant: ADOBE INC., San Jose, CA (US)

(72) Inventors: Ryan Rossi, Santa Clara, CA (US);
Vasanthi Holtcamp, Fremont, CA (US); Tak Yeon Lee, Cupertino, CA (US); Sungchul Kim, San Jose, CA (US); Sana Lee, Brea, CA (US); Nathan Ross, Highland, UT (US); John Anderson, American Fork, UT (US); Fan Du, Milpitas, CA (US); Eunyee Koh, San Jose, CA (US); Xin Qian, Greenbelt, MD (US)

(73) Assignee: ADOBE INC., San Jose, CA (US)

( * ) Notice: Subject to any disclaimer, the term of this patent is extended or adjusted under 35 U.S.C. 154(b) by 9 days.

(21) Appl. No.: 17/091,941

(22) Filed: Nov. 6, 2020

(65) Prior Publication Data

US 2022/0147540 A1     May 12, 2022

(51) Int. Cl.
*G06F 16/9535*    (2019.01)
*G06F 16/26*    (2019.01)
(Continued)

(52) U.S. Cl.
CPC ............ *G06F 16/26* (2019.01); *G06F 3/0482* (2013.01); *G06F 11/302* (2013.01); *G06F 11/3438* (2013.01); *G06F 16/9038* (2019.01)

(58) Field of Classification Search
CPC ........ G06N 20/00; G06N 5/022; G06Q 50/01; G06F 16/285; G06F 40/30
(Continued)

(56) References Cited

U.S. PATENT DOCUMENTS 10,783,460 B1 *   9/2020   Davis ..................... G06Q 50/14
11,205,103 B2 *   12/2021   Zhang ................. G06K 9/6269
(Continued)

OTHER PUBLICATIONS

Belgin et al., "VizRec: Recommending Personalized Visualizations", Nov. 2016, ACM Transactions on Interactive Intelligent Systems, vol. 6, No. 4, Article 31, 39 pages.*
(Continued)

*Primary Examiner* — Tony Mahmoudi
*Assistant Examiner* — Linh Black
(74) *Attorney, Agent, or Firm* — F. Chau & Associates, LLC

(57) ABSTRACT

Systems and methods for personalized visualization recommendation are described. Embodiments of the described systems and methods are configured to identify a first matrix representing user interactions with a plurality of data attributes corresponding to a plurality of datasets, a second matrix representing user interactions with a plurality of visualizations, and a third matrix representing a plurality of meta-features for each of the data attributes; compute low-dimensional embeddings representing user characteristics, the data attributes, visualization configurations, and the meta-features using joint factorization of the first matrix, the second matrix and the third matrix; generate a model for predicting visualization preference weights based on the low-dimensional embeddings; predict the visualization preference weights for a user corresponding to a plurality of candidate visualizations of dataset using the model; and generate a personalized visualization of the dataset for the user based on the predicted visualization preference weights.

19 Claims, 10 Drawing Sheets

(51) Int. Cl.
*G06F 3/0482* (2013.01)
*G06F 11/34* (2006.01)
*G06F 11/30* (2006.01)
*G06F 16/9038* (2019.01)

(58) Field of Classification Search
USPC .... 707/E17.047, E17.059, E17.06, E17.067,
707/E17.092, E17.093, E17.138, E17.142,
707/733–734, 767
See application file for complete search history.

(56) References Cited

U.S. PATENT DOCUMENTS

| | | | | |
|---|---|---|---|---|
| 11,490,220 | B2* | 11/2022 | Omidvar Tehrani | ........................ G06F 16/9536 |
| 2008/0294686 | A1* | 11/2008 | Long | ............... G06F 16/285 707/E17.046 |
| 2010/0185578 | A1* | 7/2010 | Chi | ............... G06Q 30/02 703/2 |
| 2012/0030159 | A1* | 2/2012 | Pilaszy | ............... G06Q 30/00 706/46 |
| 2014/0122039 | A1* | 5/2014 | Xu | ............... G06F 17/18 703/2 |
| 2015/0058320 | A1* | 2/2015 | Zheng | ............... G06F 16/9535 707/722 |
| 2016/0119365 | A1* | 4/2016 | Barel | ............... G06F 16/95 726/12 |
| 2016/0179923 | A1* | 6/2016 | Chehreghani | ............... G06K 9/6223 707/637 |
| 2016/0274744 | A1* | 9/2016 | Neumann | ........... H04N 21/47202 |
| 2016/0321589 | A1* | 11/2016 | Powers | ............... G06Q 10/067 |
| 2017/0163825 | A1* | 6/2017 | Andreoli | ............... G06F 3/1203 |
| 2017/0171580 | A1* | 6/2017 | Hirsch | ............... H04L 67/62 |
| 2017/0329926 | A1* | 11/2017 | Liang | ............... G16B 5/20 |
| 2018/0095632 | A1* | 4/2018 | Leeman-Munk | ... G06F 3/04812 |
| 2018/0157971 | A1* | 6/2018 | Fusi | ............... G06F 17/16 |
| 2018/0165554 | A1* | 6/2018 | Zhang | ............... G06N 7/005 |
| 2018/0232700 | A1* | 8/2018 | Li | ............... G06N 5/04 |
| 2019/0114537 | A1* | 4/2019 | Wesolowski | ............ G06N 3/084 |
| 2020/0104426 | A1* | 4/2020 | Wu | ............... G06F 17/16 |
| 2020/0134428 | A1* | 4/2020 | Cheng | ............... G06K 9/6248 |
| 2021/0090694 | A1* | 3/2021 | Colley | ............... G16B 40/00 |
| 2022/0101093 | A1* | 3/2022 | Hildebrandt | ......... G06N 3/0481 |

OTHER PUBLICATIONS

Belgin Mutlu, et al., "VizRec: Recommending Personalized Visualizations", ACM Trans. Interact. Intell. Syst. V, N, Article A (Jan. 2016), (2015) 40 pages.

Mutlu, B., et al., "VizRec: A Two-Stage Recommender System for Personalized Visualizations", In Proceedings of the 20th International Conference on Intelligent User Interfaces Companion (Mar. 2015) (pp. 49-52).

Hu, K., et al., "VizML: A Machine Learning Approach to Visualization Recommendation", In Proceedings of the 2019 CHI Conference on Human Factors in Computing Systems, (May 2019), 14 pages.

Moritz, D., et al., "Formalizing Visualization Design Knowledge as Constraints: Actionable and Extensible Models in Draco", IEEE transactions on visualization and computer graphics, 25(1), (2018), pp. 438-448.

* cited by examiner

PERSONALIZED VISUALIZATION RECOMMENDATION SYSTEM

BACKGROUND

The following relates generally to data visualization, and more specifically to recommendation of customized data visualizations.

Data analysis, or analytics, is the process of inspecting, cleaning, transforming and modeling data. In some cases, data analytics systems may include components for discovering useful information, collecting information, informing conclusions and supporting decision-making. Data analysis can be used to make decisions in a business, government, science or personal context. Data analysis includes a number of subfields including data mining and business intelligence.

In the field of data analytics, people often use data visualization tools to help understand their large datasets and manage user preferences. In many cases, data can be visualized in many different ways, and the best way to visualize a given dataset may depend on numerous factors including the type of data being visualized and user preferences.

Conventional data visualization tools sometimes provide customizable data visualization configurations that enable a user to modify how data is displayed. However, if a user uploads a new dataset, configurations applied to previous datasets may not be applicable to the new dataset. In some cases, users must continually select a new visualization configuration for each new dataset. Therefore, there is a need in the art for a data visualization tool that can automatically select a customized visualization for a user to visualize a new dataset.

SUMMARY

The present disclosure describes systems and methods for creating customized visualization configurations. Embodiments of the inventive concept utilize data collected from interactions between users, datasets and visualization configurations. In some cases, meta-features of each dataset are also computed. The user interaction information and the meta-features of the dataset are used to create low-dimensional embedding information, which can then be used to predict customized visualization preferences when a user interacts with a new database.

A method, apparatus, and non-transitory computer readable medium for data visualization are described. Embodiments of the method, apparatus, and non-transitory computer readable medium are configured to identify a user and at least one dataset, predict visualization preference weights corresponding to a plurality of candidate visualizations of the at least one dataset for the user, wherein the visualization preference weights are predicted using a model comprising low-dimensional embeddings of user characteristics of the user, data attributes of the at least one dataset, and visualization configurations, and wherein the model is generated based on user interactions with a plurality of visualizations for a plurality of datasets and meta-features representing a plurality of data attributes for each of the plurality of datasets, and generate a personalized visualization (or visualization recommendation) for the at least one dataset for the user based on the predicted preference weights.

A method, apparatus, and non-transitory computer readable medium for data visualization are described. Embodiments of the method, apparatus, and non-transitory computer readable medium are configured to identify a first matrix representing user interactions with a plurality of data attributes corresponding to a plurality of datasets, identify a second matrix representing user interactions with a plurality of visualizations, identify a third matrix representing a plurality of meta-features for each of the data attributes, compute low-dimensional embeddings representing user characteristics, the data attributes, visualization configurations, and the meta-features using joint factorization of the first matrix, the second matrix and the third matrix, generate a model for predicting visualization preference weights based on the low-dimensional embeddings, predict the visualization preference weights for a user corresponding to a plurality of candidate visualizations of at least one dataset using the model, and generate a personalized visualization (or visualization recommendation) for the at least one dataset for the user based on the predicted visualization preference weights.

An apparatus and method for data visualization are described. Embodiments of the apparatus and method include a data collection component configured to obtain first information representing user interactions with a plurality of data attributes for each of a plurality of datasets, second information representing user interactions with a plurality of visualizations of the plurality of datasets, and third information representing a plurality of meta-features for each of the data attributes, an embedding component configured to compute low-dimensional embeddings of user characteristics, the data attributes, and visualization configurations based on the first information, the second information and the third information, and a preference component configured to predict visualization preference weights for personalized visualizations based on the low-dimensional embeddings.

DETAILED DESCRIPTION

Figure 1:
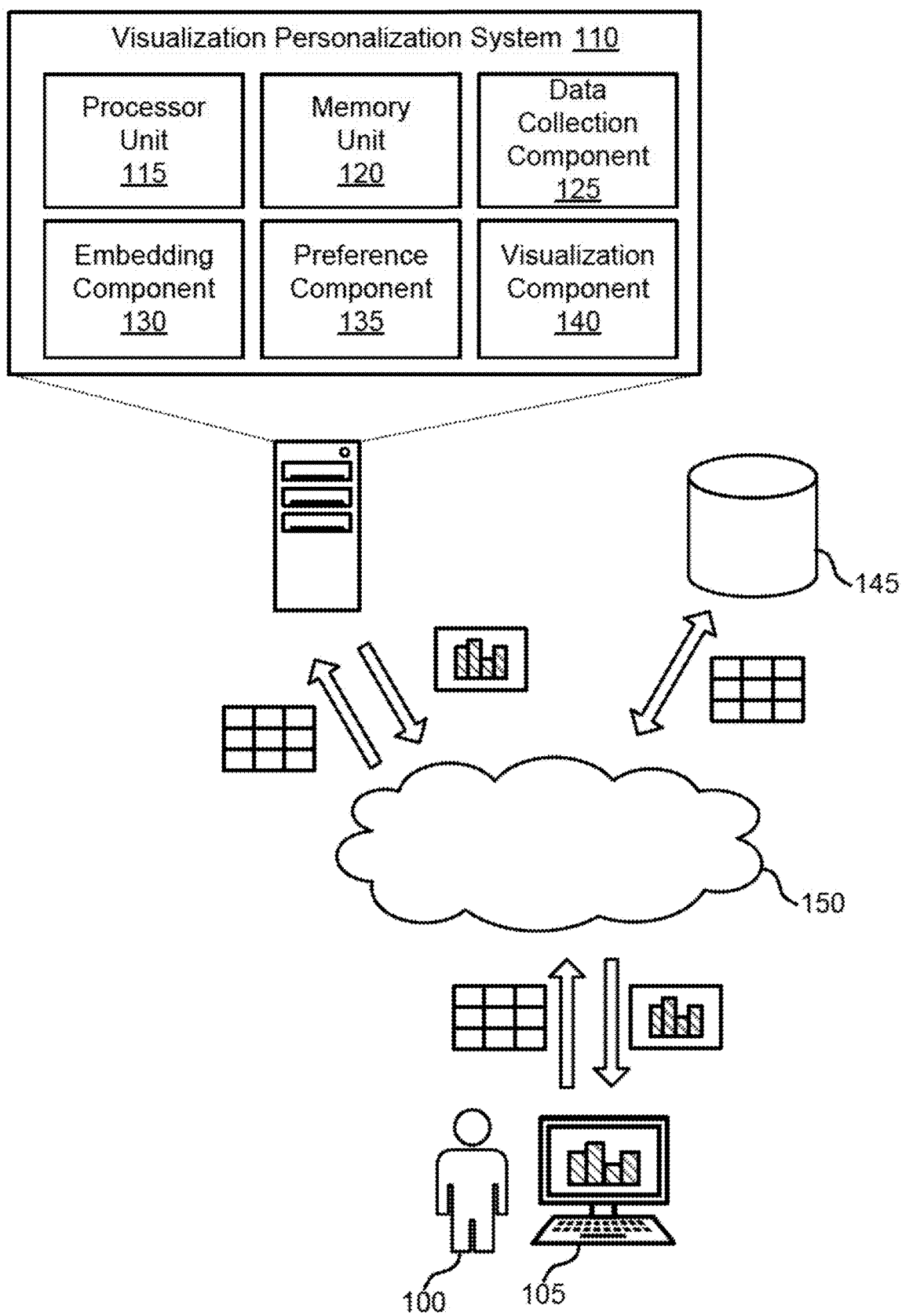
FIG. 1 shows an example of a system for data visualization according to aspects of the present disclosure.

The present disclosure relates to systems and methods for performing data analytics. Some embodiments of the present disclosure relate to personalized visualization recommendation, in which visualizations are automatically generated for users to explore. In some examples, a matrix optimization model (e.g., joint matrix factorization, joint tensor factorization) is trained to predict visualization recommendation for a new user or dataset.

Data visualization is an important component of many data analytics tools. In some cases, software tools allow users to customize visualization preferences. However, conventional data visualization tools are not capable of generating customized visualizations of new datasets for specific users because they do not model user characteristics. For example, rule-based systems do not model user-specific preferences. Therefore, the visualizations are the same across all users. Other recommendation tools learn user preferences, but these tools limit users to interacting with a single large dataset.

Furthermore, conventional visualization recommendation models typically depend on explicit user feedback. These models are not sensitive to variables, visualizations, data transformations, encodings, chart-type clicked or used by a user in the past. Instead, they depend on tags assigned by users to the various visualizations and visualization ratings (i.e., explicit feedback). Explicit feedback is costly, biased, and rare because most users would not tag visualizations, nor would they rate them (e.g., on a scale 1-7). As a result, conventional visualization recommendation models are unable to leverage implicit user feedback and learn user preferences located in multiple different datasets.

To address these deficiencies in conventional data visualization tools, embodiments of the present disclosure include an improved data visualization tool that can predict user-specific preferences for new datasets based on a model of user preferences. The model of user preferences can be based on information collected from user interactions with other datasets, user interactions with various visualizations of the other datasets, and attributes of the new dataset. Certain embodiments include the unconventional technique of embedding the user interaction information and the features of the dataset to create low-dimensional embedding information. For example, the low-dimensional embedding information may provide a model of user preferences having a lower number of dimensions than the data used to create the low-dimensional embedding information. As a result, the improved data visualization tool of the present disclosure can predict customized visualization preferences when a user interacts with a new database.

Accordingly, an improved visualization personalization system or device according to the present disclosure is capable of ranking and recommending customized visualizations based on useful preferences from other users and datasets that are similar to the new user or the new dataset. As a result, the improved data visualization tool may provide personalized recommendations based on explicit and implicit user feedback, as well as explicit user preferences associated with different datasets.

In some embodiments, a visualization personalization system or device is trained to rank and recommend the top visualizations for the new user and the dataset (and/or variables from the uploaded dataset) based on a dataset selected or uploaded by a new user, other users, datasets from these other users (or a collection of datasets used by users of the system in the past), and previous preferences from these other users (e.g., preferred visualization types, variables, visualization configurations, etc.). The visualization personalization system or device is trained based on the new user's behavior, preferences of other similar users, as well as their implicit and explicit user feedback related to their preferences with respect to the dataset, visualization types, variables, visualization configurations, and other useful preferences related to the new user and the dataset.

System Overview

FIG. 1 shows an example of a system for data visualization according to aspects of the present disclosure. The example shown includes user 100, user device 105, visualization personalization system 110, database 145, and cloud 150. In one embodiment, visualization personalization system 110 includes processor unit 115, memory unit 120, data collection component 125, embedding component 130, preference component 135, and visualization component 140. However, in some embodiments, the components and functions of the visualization personalization system 110 are located on the user device 105. Visualization personalization system 110 is an example of, or includes aspects of, the corresponding element described with reference to FIGS. 3 and 7.

User 100 is an example of, or includes aspects of, the corresponding element described with reference to FIG. 7. The user 100 may communicate with visualization personalization system 110 via the user device 105 and the cloud 150. For example, the user uploads a dataset to train visualization personalization system 110 to generate personalized visualizations that the user would prefer. The dataset uploaded by the user are stored in the database 145. In another example, the user 100 provides an additional dataset and visualization personalization system 110 is updated based on the additional dataset. The additional dataset is added to the database 145.

The user device 105 may be a personal computer, laptop computer, mainframe computer, palmtop computer, personal assistant, mobile device, or any other suitable processing apparatus.

A database 145 is an organized collection of data. For example, a database 145 stores data in a specified format known as a schema. A database 145 may be structured as a single database 145, a distributed database 145, multiple distributed databases 145, or an emergency backup database 145. In some cases, a database 145 controller may manage data storage and processing in a database 145. In some cases, a user 100 interacts with database 145 controller. In other cases, database 145 controller may operate automatically without user 100 interaction.

A cloud 150 is a computer network configured to provide on-demand availability of computer system resources, such as data storage and computing power. In some examples, the cloud 150 provides resources without active management by the user 100. The term cloud 150 is sometimes used to describe data centers available to many users 100 over the Internet. Some large cloud 150 networks have functions distributed over multiple locations from central servers. A server is designated an edge server if it has a direct or close connection to a user 100. In some cases, a cloud 150 is limited to a single organization. In other examples, the cloud 150 is available to many organizations. In one example, a cloud 150 includes a multi-layer communications network comprising multiple edge routers and core routers. In another example, a cloud 150 is based on a local collection of switches in a single physical location.

Visualization personalization system 110 provides one or more functions to users linked by way of one or more of the various networks. In some cases, visualization personalization system 110 includes a single microprocessor board, which includes a microprocessor responsible for controlling aspects of the server. In some cases, a visualization personalization system 110 uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP). In some cases, a visualization personalization system 110 is configured to send and receive hypertext markup language (HTML) formatted files (e.g., for displaying web pages). In various embodiments, a visualization personalization system 110 comprises a general purpose computing device, a personal computer, a laptop computer, a mainframe computer, a super computer, or any other suitable processing apparatus.

A processor unit 115 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor unit 115 is configured to operate a memory array using a memory controller. In other cases, a memory controller is integrated into the processor unit 115. In some cases, the processor unit 115 is configured to execute computer-readable instructions stored in a memory to perform various functions. In some embodiments, a processor unit 115 includes special purpose components for modem processing, baseband processing, digital signal processing, or transmission processing.

Examples of a memory unit 120 include random access memory (RAM), read-only memory (ROM), or a hard disk. Examples of memory devices include solid state memory and a hard disk drive. In some examples, the memory unit 120 is used to store computer-readable, computer-executable software including instructions that, when executed, cause a processor to perform various functions described herein. In some cases, the memory unit 120 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory unit 120 store information in the form of a logical state.

According to some embodiments, data collection component 125 generates first information and second information based on monitoring the user interactions, where the first information relates a set of users 100 with the set of data attributes and the second information relates the set of users 100 with the set of visualizations. In some examples, the user interactions include at least one from a set including clicking on elements of the visualizations, hovering on elements of the visualizations, selection of chart types for the visualizations, utilization of data transformations for the set of datasets, and selection of colors for the visualizations. In some examples, data collection component 125 identifies additional user interactions.

According to some embodiments, data collection component 125 identifies a first matrix representing user interactions with a set of data attributes corresponding to a set of datasets. Data collection component 125 identifies a second matrix representing user interactions with a set of visualizations. In some cases, data collection component 125 updates the first matrix and the third matrix based on the additional data attributes.

In some examples, the data collection component 125 is configured to monitor the user interactions with the set of data attributes for each of the set of datasets and the user interactions with the set of visualizations of the set of datasets. Data collection component 125 is an example of, or includes aspects of, the corresponding element described with reference to FIGS. 3 and 7.

According to an embodiment of the present disclosure, the data collection component 125 is configured to identify and collect user-level data preferences across multiple different datasets. Since visualizations are dataset dependent (representing a set of design choices and data), a disjoint or unique set of visualizations are generated for each user-specific dataset. Hence, given two datasets, the visualizations generated for each dataset is completely disjoint with no shared visualizations. According to an embodiment, the data collection component 125 encodes users, their interactions with variables (i.e., attributes in any dataset, and for all user datasets) and every variable in every dataset is mapped to a shared k-dimensional meta-feature space such that visualization personalization system 110 learns from user-level data preferences across the multiple different datasets.

According to an embodiment, the data collection component 125 (or meta-feature component in FIG. 3) is used to derive meta-features for arbitrary variables. The data collection component 125 is used to derive meta-features for arbitrary variables (attributes or columns). The meta-feature component maps all variables in a user-specific dataset into a shared k-dimensional meta-feature space such that visualization personalization system 110 learns from variable preferences across multiple different datasets. The visualization personalization system 110 makes connections between other user-specific variables or datasets that are similar to the specific user's dataset with respect to the k-dimensional meta-feature space.

According to an embodiment, the meta-feature component uses data representations that partition the values of a single variable or column or attribute. Given each partition, the data collection component 125 automatically derives new meta-features. The data collection component 125 derives a meta-embedding of the meta-features to automatically find the most informative and discriminate ones.

According to some embodiments, embedding component 130 performs joint matrix factorization on the first information, the second information, and the third information to learn the low-dimensional embeddings. In other examples, embedding component 130 performs joint tensor factorization on the first information, the second information, and the third information to learn the low-dimensional embeddings.

However, joint matrix factorization and joint tensor factorization are examples of methods used to obtain embeddings of users, visualization configurations, data attributes/variables. Other methods may also be used to derive low-dimensional embeddings based on matrix representation, and embodiments of the present disclosure invention are not limited to joint matrix factorization and joint tensor factorization.

According to some embodiments, embedding component 130 computes low-dimensional embeddings representing user characteristics, the data attributes, visualization configurations, and the meta-features using joint factorization of the first matrix, the second matrix and the third matrix. In some examples, the low-dimensional embeddings include a fourth matrix representing the user characteristics, a fifth matrix representing the data attributes, a sixth matrix representing the visualization configurations, and a seventh matrix representing the meta-features. In some examples, embedding component 130 performs a coordinate descent operation, where the low-dimensional embeddings are based on the coordinate descent operation. In some examples, embedding component 130 identifies at least one regularization term, where the low-dimensional embeddings are computed based on the at least one regularization term. In some examples, embedding component 130 updates the low-dimensional embeddings based on the updated first matrix and the updated third matrix.

According to some embodiments, embedding component 130 is configured to compute low-dimensional embeddings of user characteristics, the data attributes, and visualization configurations based on the first information, the second information and the third information. Embedding component 130 is an example of, or includes aspects of, the corresponding element described with reference to FIGS. 3, 6, and 7.

Based on visualization preference matrices, one embodiment of the present disclosure learns a model based on collective or coupled factorization where for each matrix, there is at least one low-dimensional factor matrix for each unique mode. These low-dimensional matrices are leveraged for predicting and ranking (i.e., recommending the top-k choices) of things such as visualizations, chart-types, variables, etc. In one embodiment, deep learning or neural network methods (e.g., CNN) may be used.

According to some embodiments, preference component 135 identifies a user 100 and at least one dataset. In some examples, preference component 135 predicts visualization preference weights corresponding to a set of candidate visualizations of the at least one dataset for the user 100, where the visualization preference weights are predicted using a model including low-dimensional embeddings of user characteristics of the user 100, data attributes of the at least one dataset, and visualization configurations, and where the model is generated based on user interactions with a set of visualizations for a set of datasets and meta-features representing a set of data attributes for each of the set of datasets. In some examples, preference component 135 identifies an additional dataset including additional data attributes. In some examples, preference component 135 updates the model based on the additional data attributes. In some examples, preference component 135 identifies an additional user 100. In some examples, preference component 135 updates the model based on the additional user 100. In some examples, preference component 135 updates the model based on the additional user interactions.

According to some embodiments, preference component 135 is configured to predict visualization preference weights for personalized visualizations based on the low-dimensional embeddings. In one embodiment, preference component 135 generates a model for predicting visualization preference weights based on the low-dimensional embeddings. In some examples, preference component 135 predicts the visualization preference weights for a user 100 corresponding to a set of candidate visualizations of at least one dataset using the model. Preference component 135 receives an additional dataset including additional data attributes. Preference component 135 is an example of, or includes aspects of, the corresponding element described with reference to FIGS. 3 and 7.

According to an embodiment, preference component 135 learns from user-level data preferences across multiple different datasets. Preference component 135 includes a model that maps every variable in a user-specific dataset to a k-dimensional meta-feature vector. A universal meta-feature space is shared among the variables in any arbitrary dataset, and therefore the model can learn connections between variables located in multiple different datasets.

According to an embodiment, the abstraction layer of a visualization configuration is configured to remove the dataset dependencies of a visualization. In this way, the abstraction layer models and learns from the visual preferences of users across multiple different datasets. A visualization-configuration is herein defined as an abstraction of a visualization (e.g., removing the data-dependency). The notion of a visualization-configuration is to generalize across multiple datasets. For example, visualization-configuration is independent of the instant dataset, and can be shared among users. For example, if there is a json encoding of the actual visualization, that is the design choices plus the actual variables and their data used in the visualization (hence, using this json can create the visualization precisely). This may not serve well for personalized visualization recommendation because the visualization is tied to a specific dataset used by a single user.

For example, given a visualization which includes the design choices and data choices (e.g., data used for the x, y, color variables), the model derives a visualization-configuration from it by replacing the data (variables) and data variable names by general properties. In some embodiments, the model uses the type of the variable (e.g., categorical, real-valued, etc.), however the model can use any other general property of the data. From the abstraction, the model learns from users and their visual preferences (design choices), despite that these visual preferences are for visualizations generated for a completely different dataset.

According to an embodiment, preference component 135 includes a graph model that directly learns from user-level visual preferences across multiple different datasets. A user-level visual preference graph model is used for visualization recommendation. The graph model encodes users and their visual configurations. Since each visual-configuration node represents a set of design choices that are not tied to a user-specific dataset, the model uses this user-level visual graph to infer and make connections between other similar visual-configurations that are likely useful to that user. In this way, the graph model can learn from user-level visual preferences (i.e., visual configurations) across the multiple different datasets and users.

According to an embodiment, preference component 135 uses a ranking technique to assign or ground variables to visualization configurations (e.g., using the top-r predicted variables, visual configurations and their weights) to obtain a personalized ranking of the visualizations.

According to some embodiments, visualization component 140 generates a personalized visualization (or visualization recommendation) for the at least one dataset for the user 100 based on the predicted visualization preference weights. Visualization component 140 generates a list of recommended visualizations for the user 100 based on the predicted preference weights. Visualization component 140 receives a selection input from the user 100 for selecting one of the recommended visualizations, where the personalized visualization recommendation is based on the selection input. In some examples, visualization component 140 displays data from at least one of the set of datasets based on the personalized visualization recommendation. Visualization component 140 generates an additional personalized visualization of the additional dataset based on the updated model. Visualization component 140 generates an additional personalized visualization recommendation for the additional user 100 based on the updated model.

In some examples, visualization component 140 updates the personalized visualization recommendation based on the updated model. In some examples, visualization component 140 identifies a pre-determined number of data attributes. Visualization component 140 selects a subset of the data attributes based on the pre-determined number, where the personalized visualization recommendation is based on the selected subset of data attributes. Visualization component 140 is an example of, or includes aspects of, the corresponding element described with reference to FIGS. 3 and 7.

Figure 2:
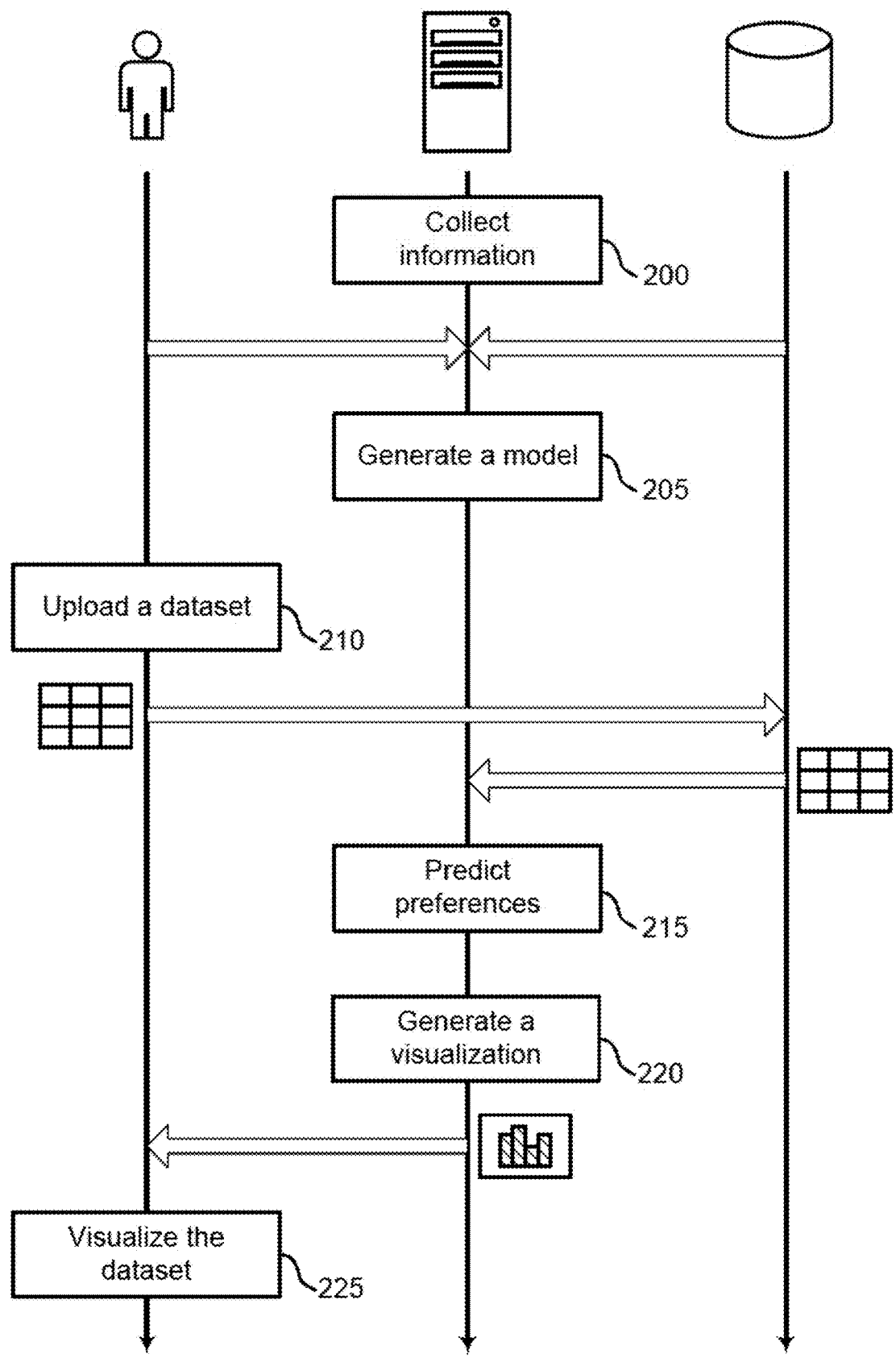
FIG. 2 shows an example of a process for providing data visualization according to aspects of the present disclosure.

FIG. 2 shows an example of a process for providing data visualization according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 200, the system collects information about user interactions with data visualizations. The information about interactions with data visualizations comes from a user, a database, or both. In some cases, users upload and explore their own datasets, which are different from any other datasets. Every user may have her own dataset. The system leverages both implicit and explicit user feedback (e.g., visualization and variable clicks, "add to dashboard" events, user's likes, etc.) for personalized visualization recommendation. In some cases, the operations of this step refer to, or may be performed by, a data collection component as described with reference to FIGS. 1, 3, and 7.

At operation 205, the system generates a model to predict visualization preferences for a user. The system learns a model by leveraging available matrices jointly, and assigns the explicit matrices more weight by incorporating a hyperparameter to moderate the influence based on how "accurate" and "useful" the user feedback is likely to be for prediction of other user preferences. In some cases, the operations of this step refer to, or may be performed by, a preference component as described with reference to FIGS. 1, 3, and 7.

According to an embodiment, the model transfers user preferences of variables, though the variables may be located in different datasets. According to an embodiment, the feature matrix is equipped with shared mode (for transferring user preferences of variables). Therefore, if a new user uploads or selects a new dataset, the model is able to recommend visualizations that use the variables that are most likely to be preferred by the new user based exclusively on the variables in a selected dataset, and the user preferences of users that have used variables with similar data characteristics or features.

In addition, first information (i.e., matrix A) is derived based on the variables that a user clicked on. According to another embodiment, the model includes additional matrices that have other forms of implicit and explicit user feedback. For example, instead of a simple click on a variable, the variables are encoded in visualizations that users liked before, or added to their dashboard.

At operation 210, the user uploads a dataset. In some cases, the user uploads or selects a new dataset never used before in the system. According to an embodiment, the visualization personalization system learns a joint factorization model based on data preference matrices and visualization preference matrices. In some cases, the operations of this step refer to, or may be performed by, a data collection component as described with reference to FIGS. 1, 3, and 7.

At operation 215, the system predicts visualization preferences for the user to visualize the dataset using the model. The visualization personalization system makes personalized prediction or recommendations based on implicit and explicit user feedback across multiple different datasets. The model predicts the preferences of the new user based on user preferences for variables that are similar to those in the new user and new uploaded dataset. In some cases, the operations of this step refer to, or may be performed by, a preference component as described with reference to FIGS. 1, 3, and 7.

According to an embodiment, the visualization personalization system learns the relationship directly between visualization configurations and the variables that are best equipped for them. To predict visualization preference weights associated with a pair of variable and visualization configuration, the visualization personalization system computes a linear combination between variables, visualization configurations, and a given user (i.e., providing a mapping between visualization configurations and variables).

At operation 220, the system generates a personalized data visualization of the dataset for the user based on the visualization preferences. The visualization personalization system outputs and displays a visualization configuration (e.g., bar chart, pie chart) on the new user's device. The new user would prefer the displayed visualization configuration as her desired design choice. In some cases, the operations of this step refer to, or may be performed by, a visualization component as described with reference to FIGS. 1, 3, and 7.

At operation 225, the user visualizes the dataset on her device. The user can continue to work on the displayed visualization configurations (e.g., through clicking, hovering, dragging, etc.). In some cases, the operations of this step refer to, or may be performed by, a user as described with reference to FIGS. 1 and 7.

Visualization Personalization System

Figure 3:
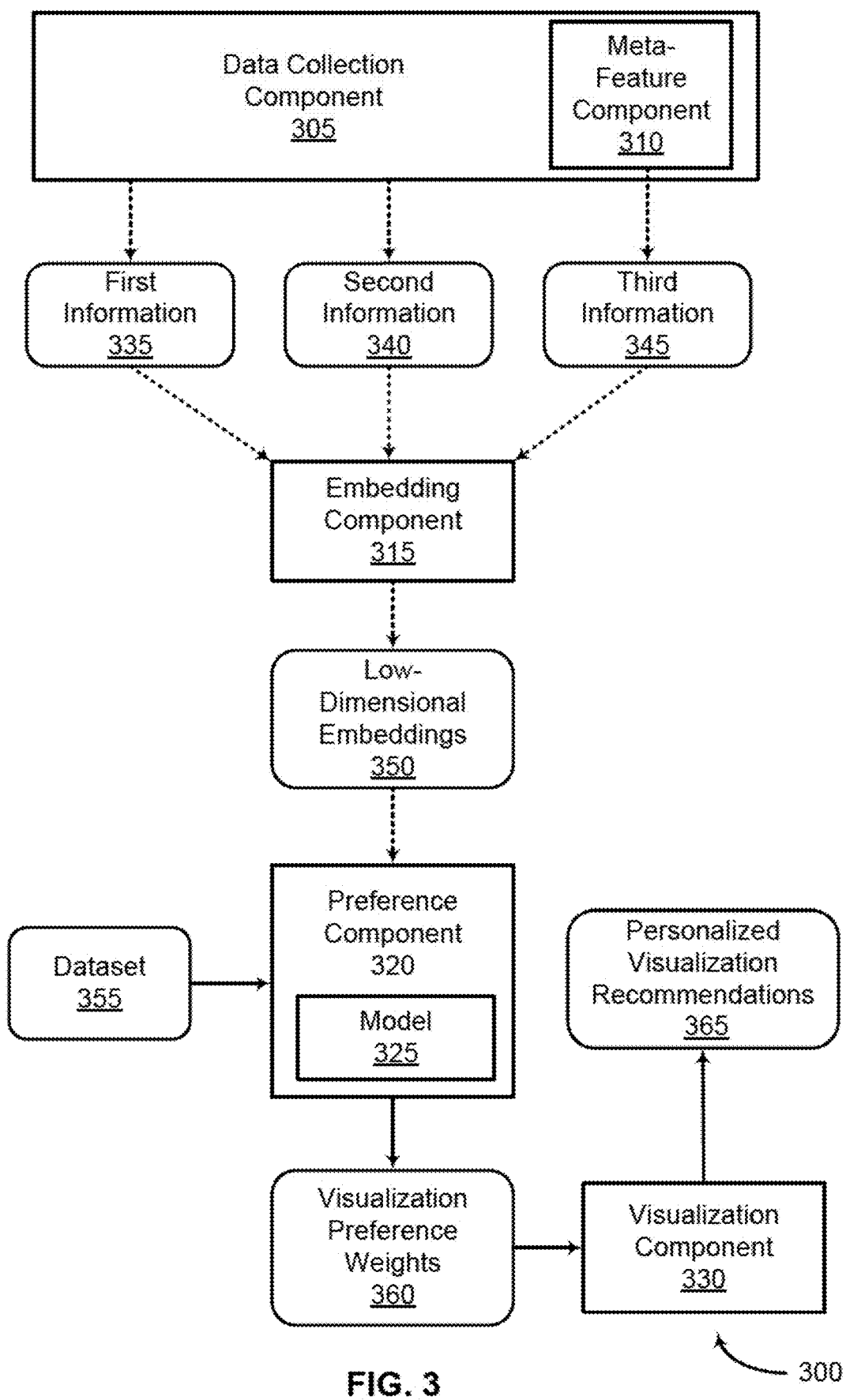
FIG. 3 shows an example of a visualization personalization system according to aspects of the present disclosure.

FIG. 3 shows an example of a visualization personalization system 300 according to aspects of the present disclosure. The example shown includes visualization personalization system 300, first information 335, second information 340, third information 345, low-dimensional embeddings 350, dataset 355, visualization preference weights 360, and personalized visualizations 365. Visualization personalization system 300 is an example of, or includes aspects of, the corresponding element described with reference to FIGS. 1 and 7. In one embodiment, visualization personalization system 300 includes data collection component 305, embedding component 315, preference component 320, and visualization component 330.

First information 335 includes user preferences related to variables users click on (and use in visualizations, etc.). According to an embodiment, first information 335 includes a large user-by-variables matrix denoted as matrix A where the variables are the variables from all the datasets that have been uploaded and used by users of the visualization personalization system 300. The entry of matrix A represents the number of times user i clicked on variable j. First information 335 is an example of, or includes aspects of, the corresponding element described with reference to FIGS. 4-6.

Second information 340 include information encoding the user preferences for different visualization aspects, including the visualization configurations, chart-type, marker-type, etc. According to an embodiment, second information 340 includes a user preference matrix denoted as matrix C. The matrix C is a user by visualization configuration matrix where each entry of the matrix C is the number of times a user clicked (or preferred) a visualization with that specific configuration. The matrix C does not depend on feature matrix B because visualization configurations are general and not dependent on the specific dataset uploaded or selected by the user. Second information 340 is an example of, or includes aspects of, the corresponding element described with reference to FIGS. 4-6.

Third information 345 includes a matrix B where the rows are the features of the variables and the columns are the variables from all the datasets that have been uploaded or selected and used by users of visualization personalization system 300. The matrix B shares a common mode with the other variable-centric matrices. Since these matrices share a mode (i.e., the variables from all the datasets that have been uploaded and used by users), one embodiment of the present disclosure can collectively and simultaneously learn a model based on these matrices. The model is able to correlate relations between variables (and visualizations) across different datasets, and the model makes visualization recommendations based on these correlations and the user preferences of those variables and visualizations in other datasets, despite that users have preferences on different datasets. Third information 345 is an example of, or includes aspects of, the corresponding element described with reference to FIGS. 4-6.

The data collection component 305 is configured to derive user data preference matrices and user visualization preference matrices. The visualization personalization system 300 leverages both implicit and explicit user feedback. According to an embodiment, the data collection component 305 stores implicit and explicit user feedback. In some examples, user feedback includes (a) variables clicked or selected by the user, (b) variables in the visualization that a user clicked-on, liked, or added to their dashboard, (c) chart types frequently clicked on, liked, or added to dashboard, (d) data transformation used (sum, bin, mean, etc.) in the visualization the user clicked on, liked, or added to their dashboard, (e) encoding variable used, and type, etc., and (f) color, mark type, size, etc.

According to an embodiment, the data collection component 305 saves contextual information. For example, contextual information includes chart types that the user found to be most useful (and the frequency in which they found them to be useful). In one embodiment, the data collection component 305 collects and stores variables that the user interacted with the chart types, etc. A matrix for the user can be constructed, where the chart types and variables are useful with those chart types, and each entry is the number of times that the user clicked or selected (i.e., implying they found it to be useful) a visualization with that chart-type and variable. Such matrices are created for the other information as well (variable-data transformation pairs, etc.). The data collection component 305 derives a representation for storing user feedback efficiently in a large sparse tensor (where slices of the tensors are matrices for specific users).

According to an embodiment, instead of storing a user clicked on a variable, etc., the data collection component 305 stores the frequency (i.e., number of occurrences) that a user clicked on or selected a variable. In some embodiments, visualization personalization system 300 leverages any other user events or behavioral data. According to an embodiment, other user preference matrices are computed. Embodiments of the present disclosure are not limited to the use listed above.

Through representation based on these matrices, the visualization personalization system 300 recommends visualizations that are personalized and applicable to other systems. Data collection component 305 is an example of, or includes aspects of, the corresponding element described with reference to FIGS. 1 and 7. In one embodiment, data collection component 305 includes meta-feature component 310.

According to an embodiment, a user uploads a dataset or selects a dataset for visualization recommendation (exploratory analysis, etc.). This is denoted as $D=[d_1, \ldots, d_m]$. D is an n-by-m matrix with n rows and m variables/attributes or columns. The data can be in any user format or schema (XDM, etc.), and converted to a corresponding matrix using flattening technique. After each dataset is uploaded, it is stored with its features.

According to an embodiment, the visualization personalization system 300 computes transferable and dataset independent features for every variable/attribute (column) of the dataset. Transferable and dataset independent features (or an embedding) are those that can be derived and generalized to any arbitrary dataset. For example, the features are not dependent on a specific dataset, and are transferred and computed on any dataset. A statistical feature vector (or embeddings) is derived for every variable in the dataset. The feature vectors (or k-dimensional embedding vectors) is stored in matrix X.

According to an embodiment, the visualization personalization system 300 uses the features including number of unique values of $d_i$ denoted as $|d_i|$, percent of unique values=$|d_i|/\text{nnz}(d_i)$, density=$\text{nnz}(d_i)/n$ (or percent missing values=1−density), mean($p_i$), median($p_i$), min($p_i$), max($p_i$), var($p_i$), std($p_i$), skew($p_i$), and four kurtosis features (fisher/person, and bias/unbiased), where $p_i$ is the probability distribution given by $d_i$ (n-dimensional vector for variable i). Q1, Q3, IQR, and the percent of outliers present in the variable (detected using lb, ub, total outliers from both lb and ub) are used. According to various examples, the framework may use quartile dispersion coefficient, median absolute deviation, coefficient of variation, efficiency ratio, variance-to-mean ratio, entropy, normalized entropy, gini coefficient, signal-to-noise ratio, among other information theoretic features. However, the disclosure is not limited to these examples, and other attribute meta-features may also be used.

The visualization personalization system 300 derives features based on the names of the variable itself, e.g., number of characters in the variable name. When numerical variables have high cardinality, the visualization personalization system 300 uses binning to obtain a discrete probability distribution to make the above features involving $p_i$ more useful. These are examples of meta-features that can be used. Embodiments of the present disclosure are not limited thereto. The system can support many other types of meta-features and is completely agnostic to the choice.

According to some embodiments, meta-feature component 310 generates third information 345 by computing aggregate statistical properties of data corresponding to each of the data attributes, where the third information 345 includes the meta-features. In some examples, meta-feature component 310 performs unsupervised data clustering to generate one or more landmark features, where the meta-features include the landmark features. Meta-feature component 310 identifies a third matrix representing a set of meta-features for each of the data attributes.

According to an embodiment of the present disclosure, meta-feature component 310 is configured to derive landmark features using unsupervised clustering and outlier detection algorithms. The meta-feature component 310 uses k-means with a fixed number of clusters and derives landmark result-based features from the clustering results. In one example, the meta-feature component 310 uses the sum of squared distances after a fixed number of trials, the mean silhouette coefficient, number of iterations, etc.

According to an embodiment, the features are computed on the original variable vector representation d, or from the probability distribution vector p, or on any other vector representation of the original variable column data. Therefore, from each of these representations, the visualization personalization system 300 obtains a large number of features that characterize different aspects of the underlying variable (column) data. Similar to representing the original variable vector d as a probability distribution p and computing features from that representation, one embodiment derives other scale-invariant and dimensionless representations of the data using different normalization functions g(.) over the variable (column) vector. The features are derived from each of these representations.

According to an embodiment, given a variable (column) d (or p, . . . ), the visualization personalization system 300 groups the values into a fixed number of sets and computes many of the features described above over each set individually. An unsupervised clustering algorithm may be used. Alternatively or additionally, the visualization personalization system 300 is configured to performs binning on the feature values. As for clustering, one embodiment provides an ordering of the different clusters (sets of values), which is achieved by computing the mean or median of each cluster and ensuring that the different cluster features are represented in that order (e.g., from smallest cluster mean or median to largest cluster mean or median).

The visualization personalization system 300 derives a large number of features that accurately encodes and captures the main characteristics of each variable. The number of features is largely controlled by the different data representations used, number of clusters and/or bins used (e.g., if the visualization personalization system 300 derives 30 features for each cluster/bin of values and fix the number of clusters/bins at four, using the approach with some fixed representation of the data (e.g., d, p, etc.) provides 120 features, in addition to all the other features mentioned).

According to an embodiment, meta-feature construction includes transforming x using different data representations. For example, the resulting vectors may be used with the above meta-feature functions. However, other data representations may also be used.

In some cases, the meta-feature functions are also referred to as first statistical meta-features since they can be used over any arbitrary representation of the data, or subset/partition of values. Further, one embodiment of the present disclosure partitions the values of the variable using unsupervised clustering, quartiles, etc., and obtains meta-features for each partition by applying the meta-feature functions.

According to an embodiment, the meta-feature component 310 is configured to compute landmark features using fast machine learning algorithms (e.g., logistic regression). The meta-feature component 310 obtains the results of the algorithms, and derives features based on the results. These landmark features (and any other additional features) are concatenated onto the end of the feature matrix computed previously. According to an embodiment, the features are independent of the dataset.

Embedding component 315 is configured to compute low-dimensional embeddings 350 of user characteristics, the data attributes, and visualization configurations based on the first information, the second information and the third information. Embedding component 315 is an example of, or includes aspects of, the corresponding element described with reference to FIGS. 1, 6, and 7. Low-dimensional embeddings 350 is an example of, or includes aspects of, the corresponding element described with reference to FIGS. 6 and 7.

Dataset 355 may be selected or uploaded by a user and is input to preference component 320 for inference. In some cases, such as if the dataset 355 is a newly uploaded dataset, it may be collected by data collection component 305, and then subsequently transmitted to the preference component 320.

The preference component 320 is configured to predict visualization preference weights 360 corresponding to a plurality of candidate visualizations of the uploaded dataset for the user. In one embodiment, the preference component 320 includes the model 325. The visualization preference weights 360 are predicted using the model 325 comprising low-dimensional embeddings of user characteristics of the user, data attributes of the dataset 355, and visualization configurations. A personalized visualization (or visualization recommendation) of the dataset 355 is generated for the user based on the predicted visualization preference weights 360. The model 325 is generated based on user interactions with a set of visualizations for a set of datasets and meta-features representing a set of data attributes for each of the set of datasets. According to an embodiment, dataset 355 is selected by the user and if the dataset 355 is a new dataset (i.e., visualization personalization system 300 has not seen the dataset in the past), dataset 355 is input to the data collection component 305. If the dataset 355 selected by the user already exists in the system, the dataset 355 is not input to the data collection component 305. In some cases, dataset 355 includes additional data attributes. The model 325 is updated based on the additional data attributes from dataset 355. The dataset 355 is an example of, or includes aspects of, the corresponding element described with reference to FIG. 7. The preference component 320 is an example of, or includes aspects of, the corresponding element described with reference to FIGS. 1 and 7. The visualization preference weights 360 is an example of, or includes aspects of, the corresponding element described with reference to FIGS. 4 and 7.

According to an embodiment, the preference component 320 is configured to learn the model 325 collectively through leveraging available matrices jointly, and assign explicit matrices more weight by incorporating a hyperparameter to moderate the influence based on how "accurate" and "useful" the user feedback is likely to be for prediction of other user preferences.

According to an embodiment, the model 325 is configured to create a variable by visualization-configuration preference matrix that encodes the preference of a variable in a particular visualization-configuration. This is represented with edges from variables to visualizations. One example includes a preference graph, where the edges between users and variables, and users and visualizations may represent any type of implicit or explicit feedback. In this example, all edges are weighted, the variable or column nodes of a dataset are shown together. Similar preference matrices can be derived based on the features. Further, each of these matrices can be derived based on different user feedback such as clicks/drags, likes, or add-to-dashboard.

According to an embodiment, the preference component 320 considers user events or implicit feedback before predicting visualization preference weights 360. Collecting implicit user feedback is useful since many users click or use different variables when interacting with a visualization recommendation system, but may not add anything to their dashboard. For example, the visualizations or variables clicked on by the user may be assigned less weight (i.e., the visualization preference weights 360) than the visualizations or variables that the user added to their dashboard. Hence, if the model 325 depends exclusively on the dashboard feedback, then performance of the model 325 to make high quality personalized recommendations may decrease. In some cases, no dashboard is created for a specific dataset.

According to an embodiment, alternatively or additionally, the model 325 uses a rule-based approach to remove any inappropriate visualization configurations for visualization recommendation. The model 325 learns rules with sufficient data. For example, if the rules are solid showing that users do not prefer certain visualizations, the model 325 does not assign these visualizations a high weight (i.e., the visualization preference weights 360) over a period of time.

According to some embodiments, the preference component 320 is configured to use factor matrices to make different types of recommendations. For example, the user and visualization-configuration factor matrices are used to make personalized visualization recommendations to a given user. Let U and V denote the user and visualization factor matrices, respectively. Then, given an incoming or active user i, a weighting of visualization configurations is obtained for user i as follows:

$$r = U_{\{i,:\}} V^T \quad (1)$$

where U and V are the user and visualization latent factor matrices. Hence $U_{\{i,:\}}$ is the low-dimensional embedding of user i. The vector denoted by r is the predicted visualization preferences for user i. In some cases, r consists of weights representing the preference or likelihood that user i would prefer each visualization configuration. The framework finds the top-k best from the vector. Finding the top-k best visualizations to recommend to the user is computed efficiently using a specialized priority queue data structure when computing r. Using the priority queue data structure when computing r saves space, especially if the number of visualization configurations is large. In addition, it avoids sorting r. However, in some cases, the framework is not dependent on using such a data structure to derive the top-k best, because all such weights (i.e., the visualization preference weights 360) may be derived and stored in memory (e.g., memory unit) or disk, for example, using the equation r and then sorting by weight.

According to an embodiment, variables are assigned to the top-k visualization configurations using the learned model to infer personalized variable weights for the specific user i. According to an embodiment, the preference component 320 is interchangeable, and therefore any arbitrary variable assignment technique may be used for grounding variables to the visualization configurations to obtain the final visualization recommendations with variable grounding. For example, the preference component 320 recommends the following visualization configuration, {chart-type: scatterplot, x-variable-type: numerical, y-variable-type: numerical, . . . } with weight $r_j$, hence this is the j-th visualization configuration for user i. Some "fields" of the visualization configuration are omitted because the variable grounding is not dependent on them.

According to an embodiment, one way to ground this visualization configuration is to use the learned latent factor matrices for the variables to obtain a ranking and weighting of the variables that are personalized for the specific user i. Based on learning, the model 325 is configured to predict personalized variable weights for user i as follows:

$$w = U_{\{i,:\}} Z^T \quad (2)$$

where Z is the variable latent factor matrix and U is the user latent factor matrix. $U_{\{i,:\}}$ is the low-dimensional embedding of user i. The personalized variable weighting vector w gives a ranking of the variables for user i. However, since the preference component 320 is directed to variables or columns in the dataset user i is actively exploring, I is defined as the indices of the variables in user i's active dataset, and the preference component 320 computes exclusively the weights of those variables (the computation runs faster since the approach avoids inferring weights of all variables across all datasets). This is computed as follows: $w_1 = U_{\{i,:I\}} Z^T$. According to an embodiment, I may be an identity matrix with the indices of the variables in the dataset actively being analyzed by user i along the diagonal set to one, and all other set to zero. Given this matrix, the preference component 320 uses $w_1 = U_{\{i,:\}} Z^T I$.

Suppose the variables being ranked are $d_1$, $d_3$ from a user dataset $D_1$. Let $w_1$, $w_2$, and $w_3$ denote the predicted variable weights for user i, which are obtained from the equation above. According to an embodiment, the preference component 320 derives the weights of the visualization configurations for user i as follows $r = U_{\{i,:\}} V^T$, which is sorted from largest to smallest to obtain the ranking. Suppose r is sorted and $r_1$ is the weight of the top-ranked visualization configuration, whereas $r_2$ is the weight of the second best visualization configuration, and so on.

According to an embodiment, top-k inferred preference weights for user i for each dataset are combined as follows:

$$P = w_v w_z^T \quad (3)$$

$$= \begin{bmatrix} \pi_1(U_{i,:}V^T) \\ \pi_1(U_{i,:}Z^T) \\ \pi_2(U_{i,:}V^T) \\ \pi_1(U_{i,:}Z^T) \\ \vdots \\ \pi_k(U_{i,:}V^T) \\ \pi_1(U_{i,:}Z^T) \end{bmatrix} \begin{matrix} \pi_1(U_{i,:}V^T)\pi_2(U_{i,:}Z^T) & \ldots & \pi_1(U_{i,:}V^T)\pi_k(U_{i,:}Z^T) \\ \\ \pi_2(U_{i,:}V^T)\pi_2(U_{i,:}Z^T) & \ldots & \pi_2(U_{i,:}V^T)\pi_k(U_{i,:}Z^T) \\ \\ \vdots & \ddots & \vdots \\ \\ \pi_k(U_{i,:}V^T)\pi_2(U_{i,:}Z^T) & \ldots & \pi_k(U_{i,:}V^T)\pi_k(U_{i,:}Z^T) \end{matrix}$$

From P, the model 325 can induce the final top-k recommendations:

$$\pi_1(vec(P)), \pi_2(vec(P)), \ldots, \pi_k(vec(P)) \quad (4)$$

where $\pi$ is an operator that gives the largest weight, and $\pi_2$ gives the second largest weight. Each weight corresponds to a visualization or a visualization configuration. The model uses U, V, Z, but does not include Y since Y is not needed for prediction.

$U_{i,:}$ is used, since $U_{i,:}$ is the embedding of user i. The model finds visualizations personalized for that user i. So $(U_{i,:} V^T)$ gives weights for all variables (the system depends on the weights for the variables in the user's selected dataset). Then $U_{i,:} Z^T$ gives the weights for the visualization-configurations for that user. Then these two (or more) weights are combined to obtain weights for all possible visualizations (where each visualization corresponds to a visualization-configuration, and a set of variables).

According to an embodiment, the predicted variable weights for user i are denoted as $w_1$, $w_2$, and $w_3$ and the weight of the j-th visualization configuration for user i is denoted as $r_1$. Based on the predicted variable weights for user i and the preference component 320 plugins the variables with the largest weight to the j-th visualization configuration (while ensuring the variable type constraints are satisfied) to obtain a weight for the j-th visualization configuration with the specific grounded variables. For example, suppose the j-th visualization configuration calls for two numerical variables, then the two numerical variables with the largest weight are selected, and a score using these is obtained, and the preference component 320 repeats a number of times using a different weighted combination of variables (e.g., {$w_1$, $w_2$}, {$w_1$, $w_3$}, and so on) in order of variable importance weights (e.g., using the top ranked variables, and visualization configurations).

According to an embodiment, there are other ways to ground the top ranked variables to the top ranked visualization configurations to generate the final visualizations recommendations for the user.

According to an embodiment, other parameters are included to improve the final ranking of visualizations. For example, one can specify the amount of variable combinations to try for a single visualization configuration, and this may ensure that the recommended visualizations are distinct enough for the user. This also improves the scalability as the model generates a small number of variable groundings for each visualization configuration.

According to an embodiment, for a given visualization configuration, the model may immediately discard any categorical variable, since this specific configuration calls for numerical variables. In another embodiment, the model uses the visual rules to filter other "visually" invalid visualizations.

According to an embodiment, a rule-based similarity search or a string matching similarity search is used to find the variables in other dataset (used by other users) that is the closest match to a variable in the current user's dataset. For example, suppose the name of a variable in dataset $D_i$ is "time", and there is another dataset $D_j$ with the name "time", or even "timestamp", then the model 325 can use a string similarity or distance function (e.g., edit distance) to determine the initial set of variables for further examination. The step is viewed as a pruning step since the space of variables across all datasets is reduced. Next, the model 325 reduces the space of variables by eliminating any variable that is of a different type (e.g., numerical, categorical, etc.), and so on. At the final stage, the model 325 applies the similarity function to the smaller set of potentially similar variables to obtain a proper ranking and weights for them, and then uses them for personalization. For example, if the model 325 determines that a different user with the most similar variable to that one, often used another variable, which is similar to a variable in the current user's dataset, then the variable is assigned a larger weight, especially if that variable "time" is already selected, but the remaining variables are not yet selected.

One embodiment leverages sequential implicit user feedback and the time differences between such sequential user information. For example, this embodiment stores and learns a model using the variable interaction sequence, or the chart-type interaction sequence, etc.

According to an embodiment, the factor matrices or tensors are learned in batch or learned incrementally in an online fashion as new dataset arrives.

Visualization component 330 is configured to generate personalized visualization recommendations 365 based on the predicted visualization preference weights 360. Personalized visualization recommendations 365 are recommended visualizations to the current user (i.e., active user). The visualization component 330 is an example of, or includes aspects of, the corresponding element described with reference to FIGS. 1 and 7. Personalized visualization recommendations 365 are an example of, or includes aspects of, the corresponding element described with reference to FIG. 7.

According to an embodiment, the visualization component 330 is configured to recommend design choices. The design choice recommendations include visualization type (e.g., scatter, line, bar box, histogram, pie, etc.), mark type or mark type to represent the column with (scatter, line, etc.), shared axis (true, false), and so on. The visualization personalization system 300 can derive user preference matrices to encode some of the multi-dimensional preferences between all the users.

Graph Representation

Figure 4:
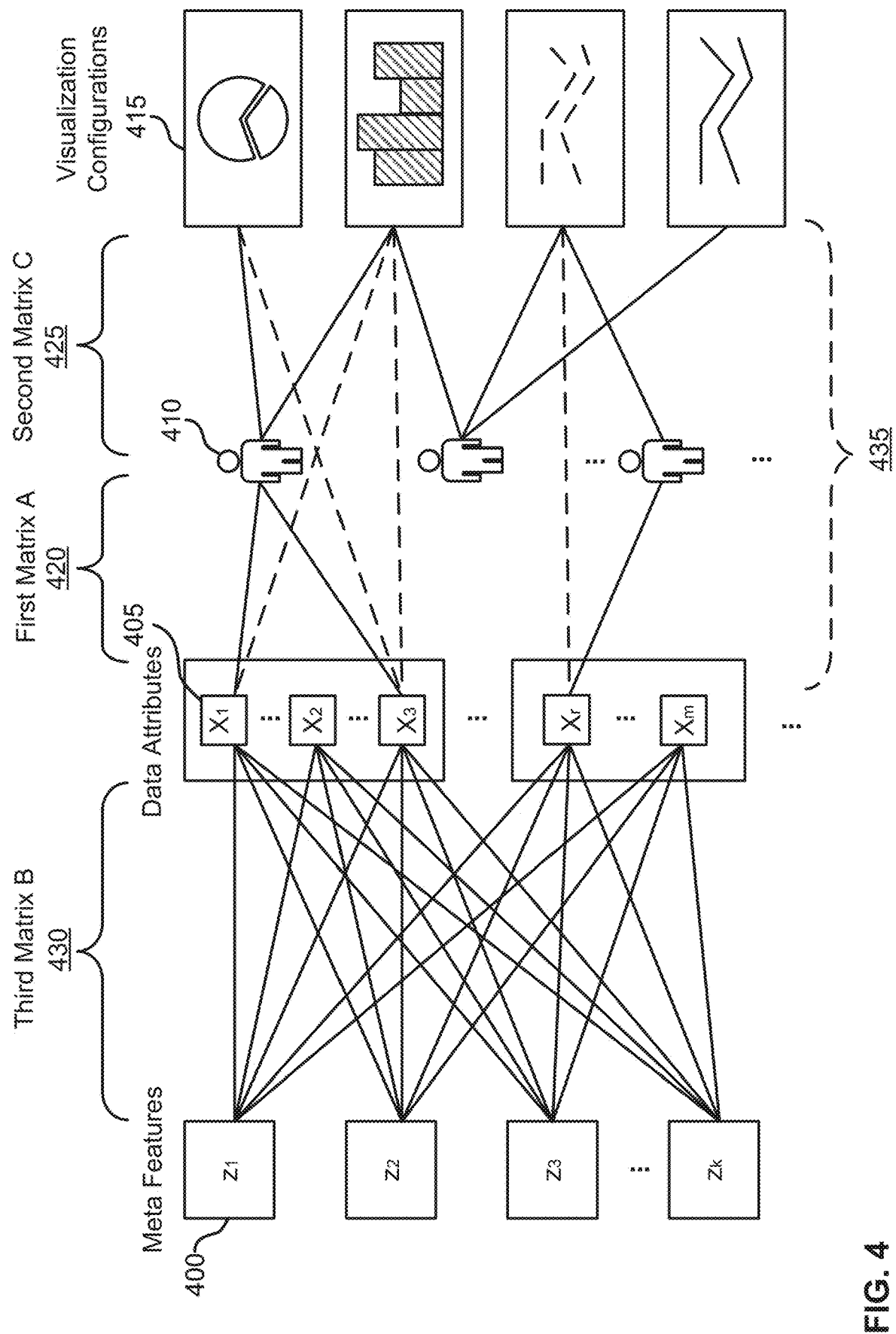
FIG. 4 shows an example of a model for predicting visualization preference weights using a graph representation according to aspects of the present disclosure.
Figure 5:
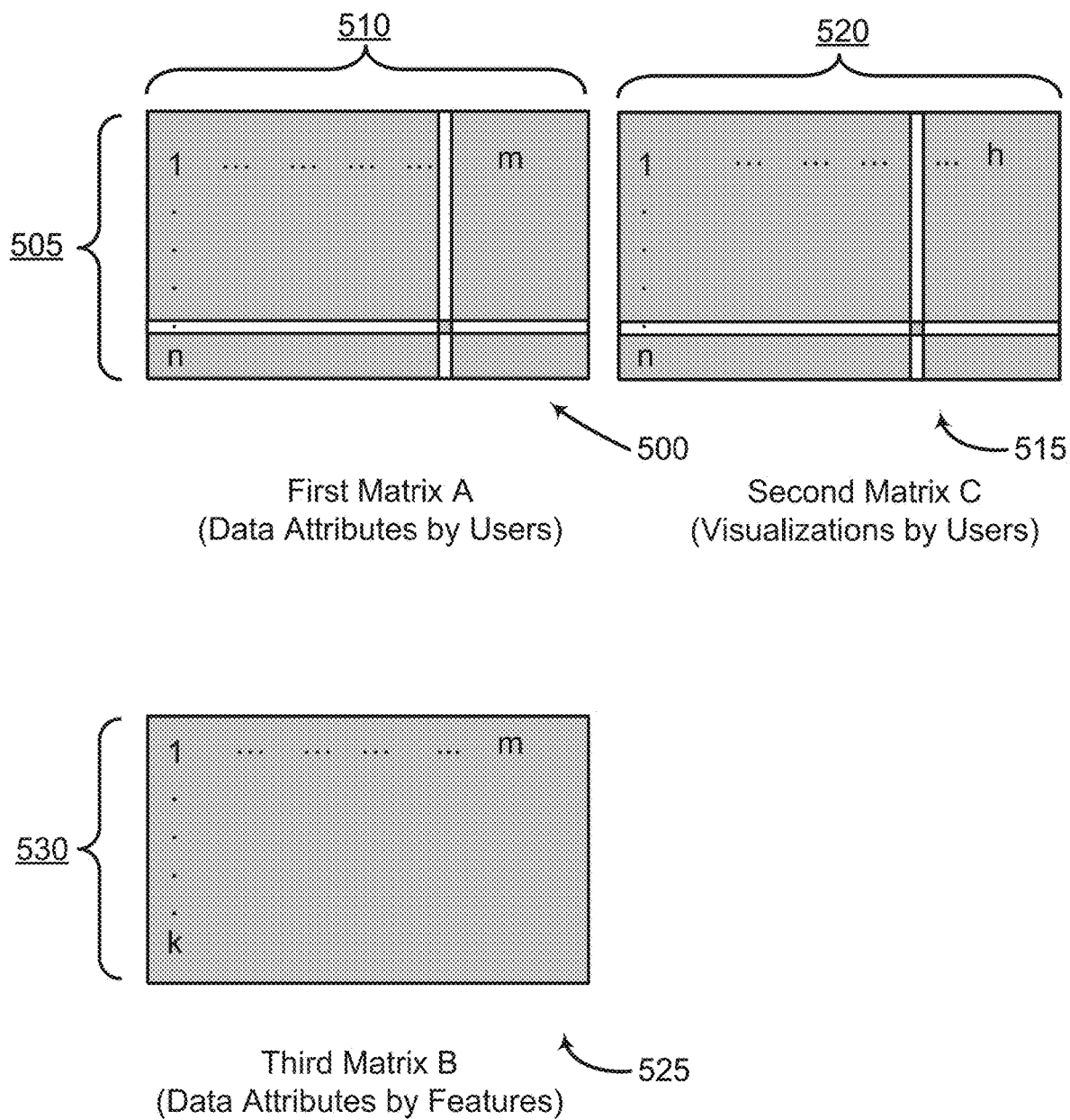
FIG. 5 shows an example of model inputs using a matrix representation according to aspects of the present disclosure.

FIG. 4 shows an example of a model for predicting visualization preference weights 435 according to aspects of the present disclosure. The example of FIG. 4 illustrates a graph representation of the relationships between the meta-features 400, data attributes 405, users 410, visualization configurations 415, first information 420, second information 425, third information 430, and visualization preference weights 435. A matrix representation of these elements is depicted in FIG. 5.

Meta-features 400 is an example of, or includes aspects of, the corresponding element described with reference to FIGS. 5 and 7. In some cases, data attributes 405 are referred to as a variable or variables. Data attributes 405 is an example of, or includes aspects of, the corresponding element described with reference to FIGS. 5 and 7.

Users 410 are an example of, or include aspects of, the corresponding element described with reference to FIG. 5. Visualization configurations 415 are an example of, or include aspects of, the corresponding element described with reference to FIG. 5. First information 420 includes user preferences related to variables users click on (and use in visualizations, etc.). According to an embodiment, first information 420 includes a large user-by-variables matrix denoted as matrix A where the variables are the variables from all the datasets that have been uploaded and used by users of the visualization personalization system. The entry of matrix A represents the number of times user i clicked on variable j. First information 420 is an example of, or includes aspects of, the corresponding element described with reference to FIGS. 3, 5, and 6.

Second information 425 include information encoding the user preferences for different visualization aspects, including the visualization configurations, chart-type, marker-type, etc. According to an embodiment, second information 425 includes a user preference matrix C. The matrix C is a user by visualization configuration matrix where each entry of the matrix C is the number of times a user clicked (or preferred) a visualization with that specific configuration. The matrix C does not depend on feature matrix B because visualization configurations are general and not dependent on the specific dataset uploaded or selected by the user. Second information 425 is an example of, or includes aspects of, the corresponding element described with reference to FIGS. 3, 5, and 6.

Third information 430 includes a matrix B where the rows are the features of the variables and the columns are the variables from all the datasets that have been uploaded or selected and used by users of visualization personalization system. The matrix B shares a common mode with the other variable-centric matrices. Third information 430 is an example of, or includes aspects of, the corresponding element described with reference to FIGS. 3, 5, and 6.

Visualization preference weights 435 connects each of the data attributes 405 with one of the visualization configurations 415. Visualization preference weights 435 are associated with each respective dashed line as shown in FIG. 4. Visualization preference weights 435 is an example of, or includes aspects of, the corresponding element described with reference to FIGS. 3 and 7.

The system shows users visualizations from which they can click, hover-over, like, etc. and these interactions are treated as the user feedback (e.g., implicit or explicit feedback). Given the preferred visualization from the users, the system decomposes a visualization into the data attributes (i.e., variables) used in the visualization, and the visualization-configuration used for the visualization, which are the set of design choices. For each visualization a user liked, clicked on, etc., the user showed a preference for some set of data attributes (since that set of data attributes was used in the visualization that a user found useful) and the visualization-configuration, which describes the design choices used to visualize it (recall a visualization-configuration is not the same as a visualization because the abstraction layer of the visualization configuration is configured to remove the dataset dependencies of the visualization).

One embodiment of the present disclosure includes a variable by visualization-configuration preference matrix that encodes the preference of a variable in a particular visualization configuration. This is represented with edges from variables to visualizations (such information is already encoded in the user preference graph, and from this graph representation, one can easily derive the variable by visualization matrix).

As illustrated in FIG. 4, an example of the preference graphs includes edges between users and variables, and users and visualizations. The edges between users and variables, and edges between users and visualizations may represent any type of implicit or explicit feedback. All edges are weighted, the variable or column nodes of dataset $D_1$ and $D_t$ are shown together. Similar preference matrices can be derived based on the features as well. Further, each of these matrices can be derived based on different user feedback such as clicks/drags, likes, or add-to-dashboard. One embodiment of the present disclosure incorporates edge types where each edge type would represent a different type of user feedback (click/drag, like, add-to-dashboard).

In some cases, users interact exclusively with a single dataset or interact with any number of datasets. More than one user can interact with the same dataset. In some other cases, some users may not interact with the same dataset, while most users interact exclusively with their own respective dataset for a variety of reasons.

According to an embodiment, variable or column nodes can potentially include edges between one another. For example, if two variable or column nodes represent "time", and thus, the system learns they have the same meaning, and thus includes a direct edge between such nodes (creating a homogeneous graph). However, it is unlikely that there are many such links, but they can be included (e.g., using schema matching or other techniques such as string similarity or edit distance metrics). Embodiments of the present disclosure are not dependent on such edges.

According to an embodiment, edges may be created between users directly under various explicit conditions, e.g., if the user selected the same dataset (and to make it stronger, ensure that the two users also preferred similar variables or columns). However, such edges between the same node are modeled. One embodiment of the present disclosure models it explicitly by computing $AA^T$, where A is assumed to be a user-by-variable matrix. In some cases, A is a user by visualization matrix.

One example of a preference graph which contains different edge types (based on the feedback type) is a heterogeneous graph. One variation of the graph model representation includes direct edges between the variables and visualization configurations that a user preferred (clicked, liked, add-to-dashboard, etc.). Further, other node types can be added to create additional paths, if the number of implicit or explicit user feedback is small or sparse. For example, node types representing design choices, and/or combinations of design choices, which are at a higher granularity than the notion of a visualization configuration, which is defined by a larger set of design choices.

Another example of a preference graph includes edges between variables used with the different visualization configuration. The preference graph is used to recommend the top visualizations personalized for a specific user i and variable j. For example, given a user i and variable j, the graph (tensor-matrix) representation is used to find the top-k visualizations personalized both for that specific user and variable combination jointly. The joint preference is inferred using the learned model.

According to some embodiments, a visualization configuration is independent of the specific dataset (and therefore columns or variables in user datasets). The visualization personalization system learns a model that recommends personalized recommendations to the user. Given the top-k visualization recommendations (i.e., visualization configurations) along with their scores, one embodiment of the present disclosure generates the recommended visualizations by grounding or assigning variables to the visualization configurations. There are many possible valid assignments of variables to each visualization configuration.

Thus, a single visualization configuration can have many different instantiations (a unique instantiation is a visualization configuration with a different variable assignment). In some examples, the user does not specify any variable assignments (e.g., selection of the variable to use for the x-axis). In some other examples, the user selects a variable to use for any part of the visualization configuration (e.g., the user selects the variable to use for the x-axis).

One embodiment includes the user by chart-type matrix (another example of user preference matrices). Further, the model also constructs combinations, e.g., if visualization configuration is the most fine-grained, certain configurations may be removed. In some cases, the model removes all but the chart-type. Other preference matrices are derived by adding more distinct node types that represent some combination of "configuration fields", e.g., instead of chart-type, the model uses x and y variable types. In another embodiment, instead of chart or visualization type, the model encodes another design choice.

Since visualization configurations are not dependent on a specific dataset uploaded or selected by a user (i.e., the matrices and prediction tasks are not tied to specific datasets), the model uses these matrices as a form of shared information between users independent of the datasets. In one embodiment, the model is not dependent on grounding or assigning variables to visualization configurations unless the model is used to recommend to the user the top-k complete visualizations. In some cases, the preference weights associated with the visualization configurations may vary depending on the user.

Matrix Representation

FIG. 5 shows an example of model inputs according to aspects of the present disclosure. FIG. 5 shows a matrix representation of first information 500, second information 515, and third information 525. A graph representation of these elements is depicted in FIG. 4.

According to some embodiments, first information 500, second information 515, and third information 525 are input to an embedding component of the visualization personalization system to derive low-dimensional embeddings.

According to an embodiment, for the user preferences related to the variables (i.e., data attributes 510) users click on (and use in visualizations, etc.), first information 500 includes a large user-by-variables matrix (matrix A) where the variables are the variables from all the datasets that have been uploaded and used by users of the system. The (i,j) entry of matrix A denoted as $A_{(i,j)}$ is the number of times user i clicked on variable j. First information 500 is an example of, or includes aspects of, the corresponding element described with reference to FIGS. 3, 4, and 6. In one embodiment, first information 500 includes users 505 and data attributes 510. Users 505 are an example of, or includes aspects of, the corresponding element described with reference to FIG. 4. Data attributes 510 are an example of, or includes aspects of, the corresponding element described with reference to FIGS. 4 and 7. In some cases, first information 500 is referred to as the matrix A.

According to an embodiment, second information 515 includes visualization configurations 520. Second information 515 is an example of, or includes aspects of, the corresponding element described with reference to FIGS. 3, 4, and 6. In some cases, second information 515 is referred to as the matrix C. "Visualization configuration" is defined herein as independent of the exact grounding of the variables in the user's dataset. For example, "visualization configuration" permits a model to obtain visualization preferences of the users that are independent of the dataset (i.e., no longer tied to a specific dataset). In this way, visualization personalization system is able to leverage visualization preferences which are not tied to specific datasets. Visualization configurations 520 are an example of, or includes aspects of, the corresponding element described with reference to FIG. 4. One example of a visualization configuration is shown below:

```
{
chart-type: {barplot, line, ...},
X-variable-type: {numerical (integer, real-valued), categorical, time, long/lat ..., none},
Y-variable-type: {numerical (integer, real-valued), categorical, time, long/lat ..., none},
marker-type: {...},
data-transformation-type: {mean, sum, bin, ..., none},
...
}
```

Example Visualization Configuration

According to an embodiment, the model may include a larger visualization configuration. Visualization personalization system is independent of the specific "fields" of the visualization configuration used, and any such fields in the configuration can be used by the system. One difference between a "visualization" and a "visualization configuration" is that the visualization configuration does not have the assignment of the actual variables. In some cases, a visualization includes a visualization configuration and the assigned variables. The above example includes a subset of options, and some other fields (e.g., color, opacity, etc.) can be added or removed.

When a user clicks, likes, or adds-to-dashboard a visualization, the model stores its visualization configuration, (i.e., the visualization without the assigned variables). Instead of the exact variable assignment (which might not be useful across for using "similar" user visualization preferences across different datasets), the model stores the types {categorical, numerical (integer, real-valued), time, long/lat, etc.} of the variables that were used. In some cases, details may be omitted that are irrelevant in visualization recommendation, such as the precise colors, etc.

According to an embodiment, any categorical variable is converted into a series of binary variables. For example, a categorical variable with three distinct values {"C1", "C2", "C3"}, the system converts this categorical variable to numerical binary variables.

According to an embodiment, the model creates matrices that represent the number of times user i selected a visualization with variable j. Further, the model creates the matrix C (i.e., second information 515) representing the number of times user i added a visualization with variable j to their dashboard, or liked a visualization with variable j, etc. Embodiments of the present disclosure are not limited to these different matrices that encode different ways users "preferred" the different variables.

In addition to the matrices that are tied to variable preferences by the users, one embodiment derives and leverages matrices that encode the user preferences for different visualization aspects, including the visualization configurations, chart-type, marker-type, etc. The matrix C is a user by visualization configuration matrix where the (i,j) entry is the number of times a user clicked (or preferred) a visualization with that specific configuration. In this case, the model does not depend upon the feature matrix B because visualization configurations are general and not dependent on the specific dataset uploaded or selected by the user. In some examples, the model derives less complex matrices that encode preferences such as {marker-type, color}, {chart-type, ...}, etc.

These visualization preferences are more universal since they do not depend on the specific dataset and/or variables in the specific dataset. According to an embodiment, the visualization preferences are used to derive more universal user preference-based matrices using the visualization configurations (e.g., {chart-type, X-variable-type, Y-variable-type, encoding-type, data-transformation-type, etc.}), preferred by the users (e.g., clicked, liked, added to dashboard), and the variable names may be replaced with their type. In this way, the user preferences are mapped to the same space. For example, users may explore different data, but prefer the same visualization configuration. Since the visualization configuration does not incorporate the specific variables used, but rather their type, the visualization configurations may be unique.

According to some embodiments, third information 525 includes a matrix B where the rows are the features of the variables and the columns are the variables from all the datasets that have been uploaded or selected and used by users of the system. The matrix B shares a common mode with the other variable-centric matrices. Since these matrices share a mode (i.e., the variables from all the datasets that have been uploaded and used by users of the system), one embodiment of the present disclosure can collectively and simultaneously use the matrices to learn a model that is able to correlate relations between variables (and visualizations) across different datasets, and then the model makes recommendations based on these correlations and the user preferences of those variables and visualizations in other datasets, despite that users have preferences on different datasets. Third information 525 is an example of, or includes aspects of, the corresponding element described with reference to FIGS. 3, 4, and 6. In one embodiment, third information 525 includes meta-features 530. Meta-features 530 is an example of, or includes aspects of, the corresponding element described with reference to FIGS. 4 and 7. In some cases, third information 525 is referred to as the matrix B.

Figure 6:
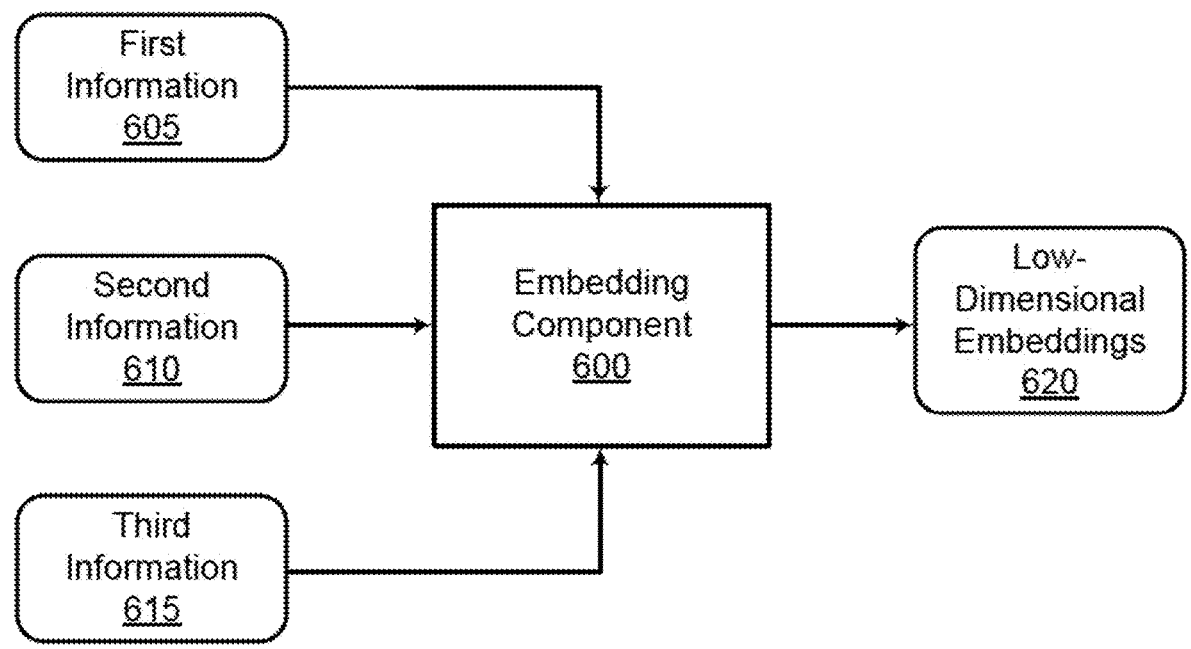
FIG. 6 shows an example of low-dimensional embedding according to aspects of the present disclosure.

FIG. 6 shows an example of low-dimensional embedding according to aspects of the present disclosure. The example shown includes embedding component 600, first information 605, second information 610, third information 615, and low-dimensional embeddings 620. Embedding component 600 is an example of, or includes aspects of, the corresponding element described with reference to FIGS. 1, 3, and 7.

According to an embodiment, first information 605 represents user interactions with a set of data attributes for each of a set of datasets. First information 605 is an example of, or includes aspects of, the corresponding element described with reference to FIGS. 3-5. Second information 610 represents user interactions with a set of visualizations of the set of datasets. Second information 610 is an example of, or includes aspects of, the corresponding element described with reference to FIGS. 3-5. Third information 615 represents a set of meta-features for each of the data attributes. Third information 615 is an example of, or includes aspects of, the corresponding element described with reference to FIGS. 3-5.

The embedding component 600 is configured to compute low-dimensional embeddings 620 of user characteristics, the data attributes, and visualization configurations based on the first information 605, the second information 610 and the third information 615. Low-dimensional embeddings 620 is an example of, or includes aspects of, the corresponding element described with reference to FIGS. 3 and 7.

To learn the factor matrices from the user data preferences and user visualization preferences, the system uses collective or joint matrix-tensor factorization technique. Embodiments of the present disclosure are not limited to the choice of technique. The system uses a few user preference matrices, and combines the user-by-variables, and features-by-variable matrices into a single large matrix. The single large matrix is referred to as augmented matrix A (i.e., the augmented matrix A combines the original matrix A with matrix B). In practice, the system learns low-dimensional embeddings 620 separately for each, which gives slightly more control for moderating the influence of each in the learning of the low-dimensional embeddings. Further, one embodiment includes multiple such matrices, e.g., one for clicks, one for likes, one for add-to-dashboard feedback, etc. Accordingly, the learning task is formulated as follows:

$$\min_{U,V,Z} \left\{ \sum_{(i,j)\in\Omega_A} (A_{ij} - u_i^T v_j)^2 + \right. \quad (5)$$

-continued
$$\left. \sum_{(i,j)\in\Omega_C} (C_{ij} - u_i^T z_j)^2 + \lambda_U \|U\|_F + \lambda_V \|V\|_F + \lambda_Z \|Z\|_F \right\}$$

where U, V, and Z are the latent factor matrices for users (and features), variables, and visualizations, respectively. The $\lambda$'s are regularization hyperparameters that trade off the loss function with the regularizer.

According to an embodiment, the learning function may not incorporate any hard constraints on the low-rank factor matrices. However, such constraints may be included. To solve the learning task, different optimization schemes may be used. In one embodiment, the framework uses scalar-block coordinate descent and solves it element-wise. Each element-wise update is computed independently, and the framework can process them in parallel. Other solvers based on stochastic gradient descent (SGD) and alternating least squares (ALS) may be used. The system is independent of the solver.

According to an embodiment, the learning task generalizes for any arbitrary number of input matrices with the requirement that they all share at least one mode with one another. Hence, instead of A and C, other matrices are included that encode different types of implicit and/or explicit feedback, e.g., if A and C are for "user clicks", then two additional matrices are derived having the same structure for "like" and/or "add-to-dashboard". More generally, the learning task is formulated as follows:

$$f(U,V,Z)=\|A-UV^T\|^2+\|C-UZ^T\|^2 \quad (6)$$

Further, matrix A denotes the user-by-variable matrix and matrix B denotes the feature-by-variable matrix (matrix C is the same as before), the learning task is formulated as follows. Given A(n×m), B(k×m), C(n×h), the model finds U, V, Z, and Y, such that $$f(U,V,Z,Y)=\|A-UV^T\|^2+\|B-YV^T\|^2+\|C-UZ^T\|^2 \quad (7)$$

where $U \in \mathbb{R}^{n \times d}$, $V \in \mathbb{R}^{m \times d}$, $Z \in \mathbb{R}^{h \times d}$, $Y \in \mathbb{R}^{k \times d}$. The following also holds for the model. $A \approx A' = UV^T = \sum_{r=1}^{d} u_r v_r^T$, $B \approx B' = YV^T = \sum_{r=1}^{d} y_r v_r^T$, $C \approx C' = UZ^T = \sum_{r=1}^{d} u_r z_r^T$. According to an embodiment, both U and V are shared. For example, U is the shared low-dimensional latent space of the users and V is the shared low-dimensional latent space of the variables.

The equation above illustrates how the embeddings are learned and outputs U, V, Z and Y. The meta-features are needed for the training of the model or embeddings. However, they are not needed when the model predicts preference weights (i.e., run inference using the model) for the visualizations, since a visualization does not have the meta-features in them. The meta-features are used to learn the model, but are not used to predict preference weights for visualizations.

According to an embodiment, to predict preference weights for visualizations, the system depends on the user embeddings, data attribute embeddings, and visualization configuration embeddings (visualization configuration is not a visualization, but rather an abstraction of a visualization).

According to an embodiment, the embedding component 600 is configured to learn the low-dimensional embeddings 620 of the users, features, variables, and visualizations. Training of the framework includes using a few user preference matrices. In practice, the framework learns low-dimensional embeddings 620 separately for each matrix, which provides more control for moderating the influence of each matrix in the learning of the low-dimensional embeddings 620. In another embodiment, the framework works with multiple such matrices, e.g., one for clicks, one for likes, one for add-to-dashboard feedback, etc. coordinate descent (CD), ALS, or stochastic gradient descent (SGD) may be used to train the model.

According to an embodiment, the learning of the parameters in each of the factor matrices is performed in parallel. In the case of optimization schemes such as CD and SGD, each individual scalar is updated in parallel. In the case of CD, the model may parallelize each rank-1 column.

According to an embodiment, factorization machines (FM) is used to make recommendations, which can be combined with other recommendations made using a learning approach based on coupled matrix-tensor factorization.

According to an embodiment, the framework may use a different representation by combining the matrices for a single type of user feedback into a single matrix. For example, an alternative representation of the user data and user visualization preference matrices can be used. Given a specific type of user feedback (e.g., click, like, add-to-dashboard), a single matrix is constructed from the user, visualizations, and feature preference matrices. The white blocks of the matrix are sub-matrices of all zeros. A single large matrix is derived based on using this representation for every action or user feedback (click, like, add-to-dashboard, etc.) and a tensor is constructed from the matrices encoding each specific type of user feedback. Then, the learning task is formulated using this representation in a similar fashion, but with a different representation. Using the representation, matrices are created for each type of feedback, and they are combined or consolidated into a large tensor, and a learning task is formulated based on this representation. For example, a tensor is derived based on the above alternative representation, where each matrix in the tensor represents a different type of user feedback.

One embodiment of the present disclosure jointly factorizes tensors and matrices of user preferences. For example, the preference matrices and/or tensors are coupled. There are other alternative ways to couple the matrices or tensors. Actions include implicit or explicit feedback such as clicks, likes, add-to-dashboard, etc. In one example, using the representation coupling two matrices and one tensor, the learning task is formulated as follows:

$$f(U,Z,W,V,Y) = \|X - [\![U,Z,W]\!]\|^2 + \|A - UV^T\|^2 + \|B - YV^T\|^2 \quad (8)$$

where $[\![U, Z, W]\!]$ denotes the standard CP model. In an example, the tensor is configured to be between users-visualizations, and actions (user feedback types, such as clicks, likes, add-to-dashboard). However, it may be defined with respect to variables since the framework has different types of user feedback for them. The representation is derived, and the task includes two preference tensors, one for visualization configurations and one for variables.

According to an embodiment, the learning task includes regularization terms and hard constraints (non-negativity, sparsity, etc.).

According to an embodiment, joint tensor-matrix factorization includes user-variable-visualization tensor where $X_{(ijk)}$ is the number of times user i used variable j in visualization configuration k. A variable by meta-feature matrix is as follows:

$$f(U,V,Z,Y) = \|X - [\![U,V,Z]\!]\|^2 + \|B - YV^T\|^2 \quad (9)$$

However, joint tensor (tensor-matrix) factorization and/or joint matrix factorization is one method that is used to obtain embeddings of users, visualization configurations, data attributes/variables. Other methods can be used to derive low-dimensional embeddings based on matrix representation, and embodiments of the present disclosure are not limited to the choice of method described herein.

Updating the Model

Figure 7:
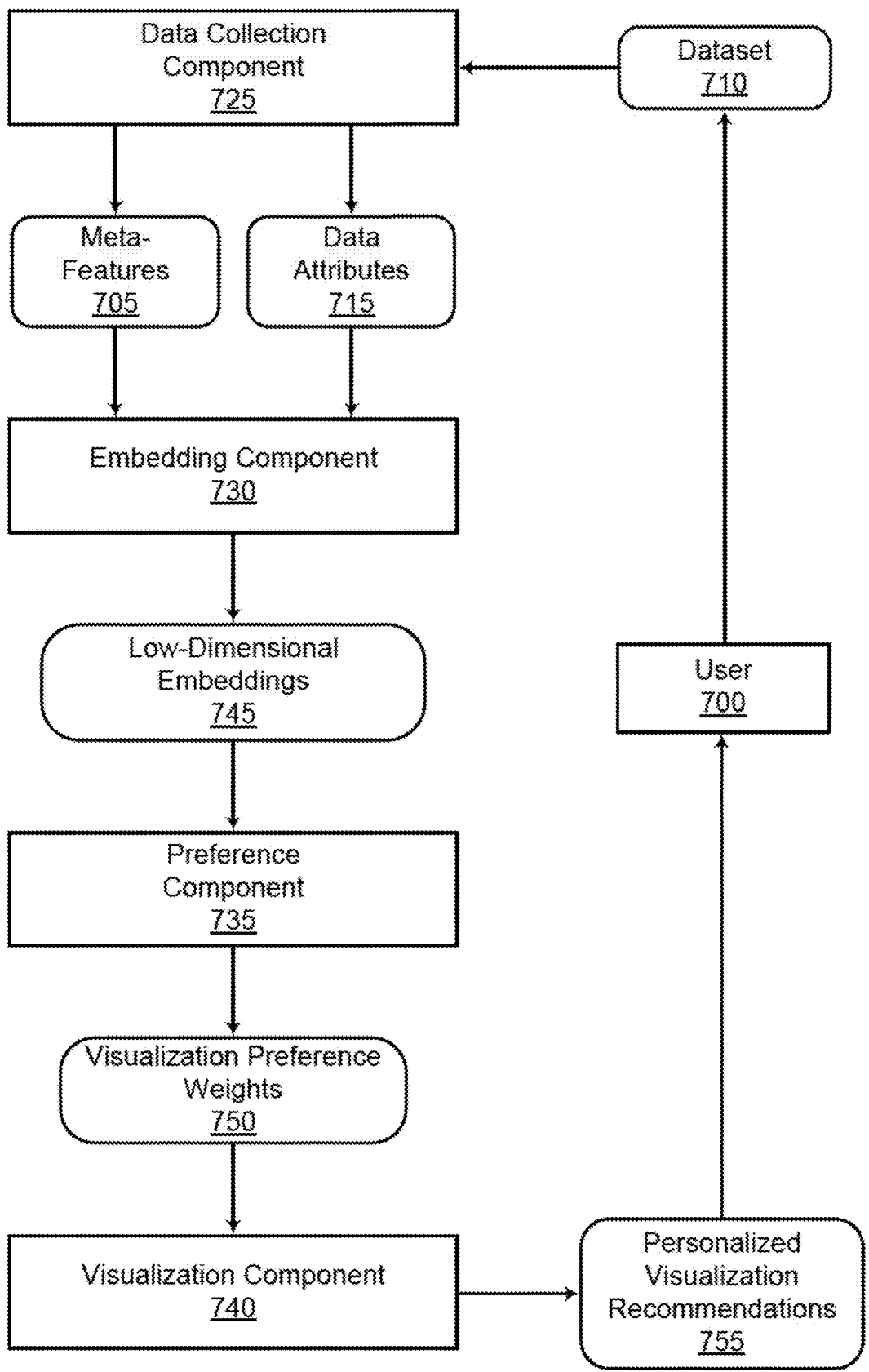
FIG. 7 shows an example of a process for updating the model according to aspects of the present disclosure.

FIG. 7 shows an example of a process for updating the model according to aspects of the present disclosure. The example shown includes user 700, meta-features 705, dataset 710, data attributes 715, visualization personalization system 720, low-dimensional embeddings 745, visualization preference weights 750, and personalized visualizations 755.

User 700 uploads or selects dataset 710. According to an embodiment, data collection component 725 receives an additional dataset 710 including additional data attributes 715 from user 700. Visualization personalization system 720 learns or updates a model based on the user 700, dataset 710 and recommends personalized visualizations accordingly. In more detail, based on the user 700 and additional data attributes 715 from user 700, along with other users, a collection of all datasets used by users, and their previous preferences (in terms of their preferred visualization types, variables, visualization configurations, etc.), visualization personalization system 720 updates a model that is able to rank and recommend the top-k best visualizations. User 700 is an example of, or includes aspects of, the corresponding element described with reference to FIG. 1. Dataset 710 is an example of, or includes aspects of, the corresponding element described with reference to FIG. 3.

In one embodiment, visualization personalization system 720 includes data collection component 725, embedding component 730, preference component 735, and visualization component 740. Visualization personalization system 720 is an example of, or includes aspects of, the corresponding element described with reference to FIGS. 1 and 3.

Data collection component 725 is configured to obtain first information representing user interactions with a set of data attributes 715 for each of a set of datasets, second information representing user interactions with a set of visualizations of the set of datasets, and third information representing a set of meta-features 705 for each of the data attributes 715. In some cases, data attributes 715 is also referred to as variables. Data collection component 725 is an example of, or includes aspects of, the corresponding element described with reference to FIGS. 1 and 3. Data attributes 715 is an example of, or includes aspects of, the corresponding element described with reference to FIGS. 4 and 5.

According to an embodiment, the first information includes a user preference matrix A where the data attributes 715 are the variables from all the datasets that have been uploaded and used by users. In some cases, the (i,j) entry of matrix A is the number of times user i clicked on variable j. The third information includes corresponding feature-by-variables matrix B. According to an embodiment, the third information includes a matrix B where the rows are the features of the variables and the columns are the variables from all the datasets that have been uploaded or selected and used by users. The matrix B shares a common mode with the other variable-centric matrices. The second information includes a user preference matrix C. The matrix C is a user by visualization configuration matrix where the (i,j) entry is the number of times a user clicked (or preferred) a visualization with that specific configuration.

According to an embodiment, unsupervised data clustering is performed to generate one or more landmark features such that the meta-features include the landmark features. Meta-features 705 is an example of, or includes aspects of, the corresponding element described with reference to FIGS. 4 and 5. Visualization personalization system 720 derives landmark features using unsupervised clustering and outlier detection algorithms. In cases of clustering, visualization personalization system 720 uses k-means with a fixed number of clusters and derives landmark result-based features from the clustering results. In one example, visualization personalization system 720 uses the sum of squared distances after a fixed number of trials, the mean silhouette coefficient, number of iterations, etc.

According to an embodiment, the features are computed on the original variable vector representation d, or from the probability distribution vector p, or on any other vector representation of the original variable column data. Therefore, from each of these representations, visualization personalization system 720 obtains a large number of features that characterize different aspects of the underlying variable (column) data. Visualization personalization system 720 derives a large number of features that accurately encodes and captures the main characteristics of each variable. The number of features is largely controlled by the different data representations used, number of clusters and/or bins used. For example, if the visualization personalization system 720 derives 30 features for each cluster/bin of values and fixes the number of clusters/bins at four, using the visualization personalization system with some fixed representation of the data (e.g., d, p, etc.) provides 120 features, in addition to all the other features.

According to an embodiment, visualization personalization system 720 jointly models both user data preferences and user visualization preferences (i.e., the first information, the second information, and the third information). The first matrix and the third matrix are updated based on the additional data attributes. Visualization personalization system 720 updates low-dimensional embeddings based on the updated first matrix and the updated third matrix. In some embodiments, meta-features 705 and data attributes 715 are input to embedding component 730. Embedding component 730 is configured to compute updated low-dimensional embeddings 745 of user characteristics, the data attributes, and visualization configurations based on the updated first information, the second information and the updated third information. Embedding component 730 is an example of, or includes aspects of, the corresponding element described with reference to FIGS. 1, 3, and 6.

According to an embodiment, embedding component 730 computes low-dimensional embeddings 745 of the users, features, variables, and visualizations. Embedding component 730 works with multiple matrices, for example, one for clicks, one for likes, one for add-to-dashboard feedback, and so on task.

According to an embodiment, embedding component 730 performs a coordinate descent operation, wherein the low-dimensional embeddings 745 are based on the coordinate descent operation. In another embodiment, embedding component 730 includes at least one regularization term, wherein the low-dimensional embeddings 745 are computed based on the at least one regularization term. Low-dimensional embeddings 745 is an example of, or includes aspects of, the corresponding element described with reference to FIGS. 3 and 6.

Preference component 735 is configured to predict visualization preference weights for personalized visualizations based on the low-dimensional embeddings 745. Preference component 735 is an example of, or includes aspects of, the corresponding element described with reference to FIGS. 1 and 3.

According to an embodiment, factor matrices are used to make visualization recommendations. The user and visualization configuration factor matrices are used to make personalized visualization recommendations to an active user. A weighting vector of visualization configurations is obtained for the active user based on the user or visualization latent factor matrices. Preference component 735 computes visualization preference weights 750 representing the predicted visualization preferences for the active user. Visualization preference weights 750 represents the preference or likelihood that the active user would prefer each visualization configuration. Preference component 735 finds the top-k best visualizations from the weighting vector to recommend to the user (e.g., using a priority queue data structure when computing the weighting vector). Visualization preference weights 750 is an example of, or includes aspects of, the corresponding element described with reference to FIGS. 3 and 4.

Visualization component 740 is configured to generate the personalized visualizations 755 based on the predicted visualization preference weights 750. The personalized visualizations 755 are displayed on the user device. The user would prefer the personalized visualization recommendations 755 and can choose to continue to work on the personalized visualization recommendations 755 to refine their configurations based on the user's preferences. Visualization component 740 is an example of, or includes aspects of, the corresponding element described with reference to FIGS. 1 and 3. Personalized visualization recommendations 755 may be an example of, or includes aspects of, the corresponding element described with reference to FIG. 3.

Inference

Figure 8:
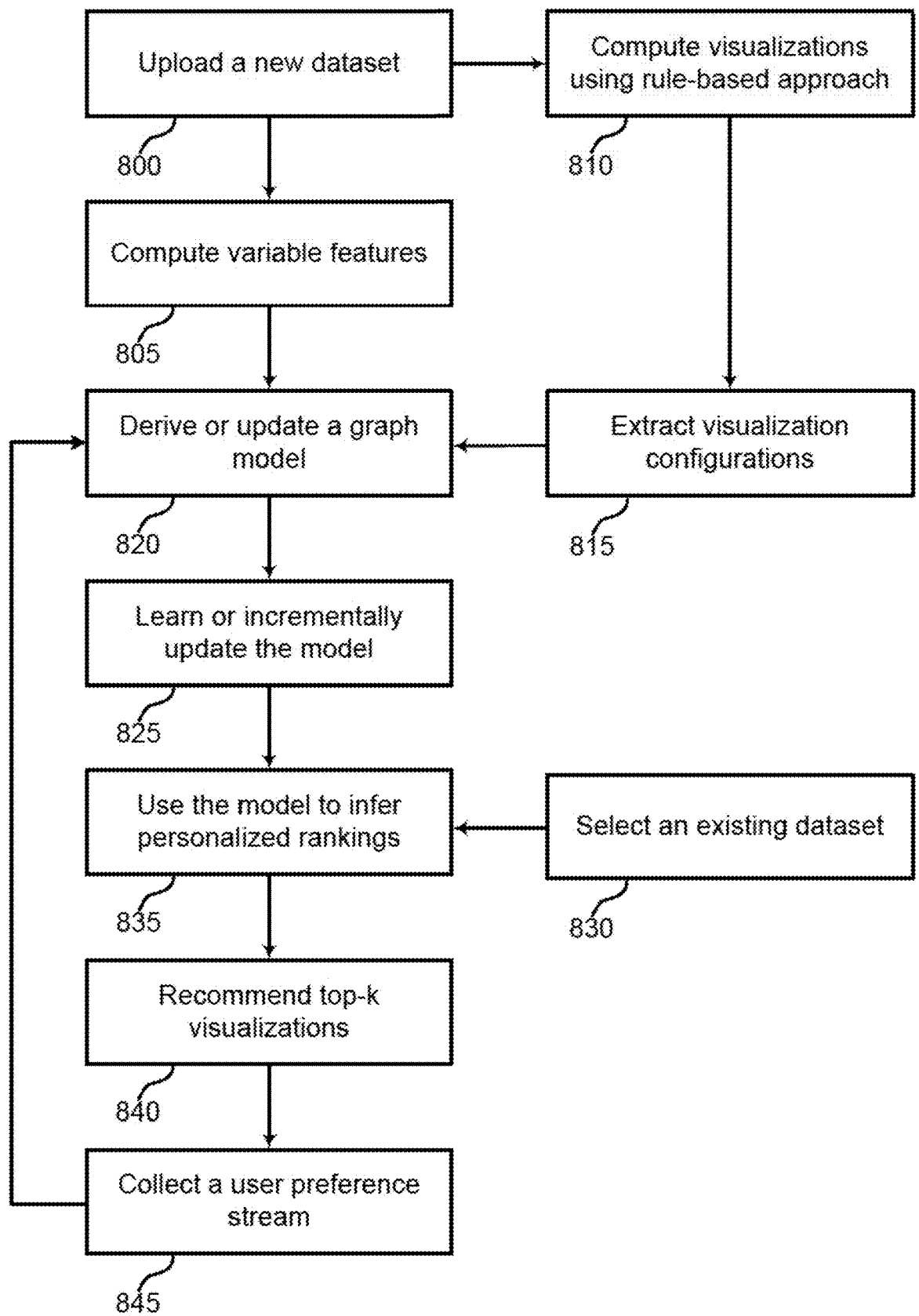
FIG. 8 shows an example of personalized visualization recommendation according to aspects of the present disclosure.

FIG. 8 shows an example of personalized visualization recommendation according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 800, a user uploads a new dataset. The new dataset has not been seen by the system or used by other users in the past. In some cases, the operations of this step refer to, or may be performed by, a user as described with reference to FIGS. 1 and 7.

At operation 805, the system computes variable features. In some cases, the operations of this step refer to, or may be performed by, a meta-feature component as described with reference to FIG. 3.

At operation 810, the system computes visualizations using rule-based approach. One embodiment of the present disclosure leverages the visualization rules or heuristics to reduce the number of possible visualizations, and recommends personalized visualizations from this subset. This increases the quality of overall personalized recommendations by ensuring that a potentially invalid visualization is not recommended to the user. In some cases, the operations of this step refer to, or may be performed by, a visualization component as described with reference to FIGS. 1, 3, and 7.

According to an embodiment, the model uses the rules or heuristics to generate valid visualization configurations that are likely to be added to the user by visualization configuration matrix. There are benefits with regards to computation, in cases when there are few observations initially, for example, user observations with respect to the visualizations they prefer (e.g., clicked or selected, liked, added-to-dashboard, etc.).

At operation 815, the system extracts visualization configurations. The model can extract the visualization configuration from the data, and add it as a node in the graph if not yet existing. The model also adds a user node connected to that visualization configuration along with variable nodes for the variables used in that visualization, which are connected to the new user node (and possibly the visualization configuration itself), and the variable nodes also have their associated feature vectors. In some cases, the operations of this step refer to, or may be performed by, a data collection component as described with reference to FIGS. 1, 3, and 7.

At operation 820, the system derives or update a graph model. The graph model representations (shared feature space, shared visualization configuration space, etc.) allow the model to leverage external positive feedback. The model learns connections between the variables used in the positive training example, and the variables another user may be interested in. In some cases, the operations of this step refer to, or may be performed by, a preference component as described with reference to FIGS. 1, 3, and 7.

According to an embodiment, the graph model includes a preference graph having different edge types (based on the feedback type). The preference graph is a heterogeneous graph. One variation of the graph model representation includes direct edges between the variables and visualization configurations that a user preferred (clicked, liked, add-to-dashboard, etc.). In another embodiment, other node types are added to create additional paths, if the number of implicit or explicit user feedback is small or sparse. For example, node types representing design choices, and/or combinations of design choices, which are at a higher granularity than the notion of a visualization configuration, which is defined by a larger set of design choices.

According to an embodiment, the preference graph includes edges between variables used and different visualization configurations. The preference graph is used to recommend the top visualizations personalized for a specific user i and variable j. For example, given a user i and variable j, the graph representation (e.g., tensor-matrix) is used to find the top-k visualizations personalized both for that specific user and variable combination jointly. The joint preference is inferred using the learned model directly. In some cases, a graph representation illustrates how different matrices interact based on the shared modes. Additional matrices can be incorporated in the graph representation.

At operation 825, the system learns or incrementally updates the model. According to some embodiments, the model is used for personalized visualization recommendation (e.g., design choices). In addition to the visualization-configuration, the model incorporates individual design choices and/or some combinations (chart-type, etc.), stores the user preferences, and applies the user preferences to derive a learning function. With the learning function, the model learns the low-dimensional embeddings, and obtains personalized rankings for the design choices specifically for the user. In some cases, the operations of this step refer to, or may be performed by, a preference component as described with reference to FIGS. 1, 3, and 7.

According to an embodiment, the model includes preference matrices, and/or uses optimization schemes, regularization, hyperparameters, or a combination thereof. According to an embodiment, the system derives the user preference matrices (and tensors, when users utilize more than one type of feedback, e.g., user-clicks-visualization, user-likes-visualization) if they do not exist yet.

In some cases, these matrices are already computed, and the model is updated accordingly. For example, a user uploads a new dataset, and the system updates the appropriate matrices as opposed to precomputing them from scratch through adding the appropriate columns in the matrices that encode information about the dataset variables (e.g., user-by-variables, features-by-variables, etc.) If the user is a new user, then a row is added to the appropriate matrices or tensors that represent users, and so on. Besides adding rows or columns of zeros, the matrix or tensor involving the feature-by-variable matrix is updated with the computed feature values for the variables in the new dataset.

In some cases, the user is new, the system does not have any implicit or explicit feedback for this specific user apart from the dataset uploaded. But the system has both implicit and explicit feedback from users that analyzed, uploaded or selected a dataset with similar columns or variables to the new dataset from the new user. In some other cases, if the user is not new, but the dataset uploaded is new, then the visualization personalization system personalizes the visualizations using that user's past behavior on other datasets with similar features.

At operation 830, the user selects an existing dataset. For example, the dataset is already used in the visualization personalization system by other users. In some cases, the operations of this step refer to, or may be performed by, a user as described with reference to FIGS. 1 and 7.

At operation 835, the system uses the model to infer personalized rankings. In some cases, the operations of this step refer to, or may be performed by, a preference component as described with reference to FIGS. 1, 3, and 7.

At operation 840, the system recommends top-k visualizations. According to an embodiment of the present disclosure, if the user selects an existing dataset, the model uses the previously learned model to infer the top-k personalized visualization recommendations for that user. Further, during the prediction step where the model is used to infer rankings and recommendations that are personalized for that specific user, the model also applies the visual rule-based approach to ensure that each visualization in the top-k personalized visualization recommendations is valid with respect to the visual rule-based approach. If not, then the model removes the visualization and uses the next visualization with the largest weight (i.e., select the visualization having the second largest weight). In some cases, the operations of this step refer to, or may be performed by, a visualization component as described with reference to FIGS. 1, 3, and 7.

At operation 845, the system collects a user preference stream. In some cases, when the user selects an existing dataset, the model shows the top-k visualizations personalized for that user. Once the user begins querying the data, this may depend on updating to the graph, model, inference, and so on. Therefore, it is referred to as the "user preference stream". The operations of this step refer to, or may be performed by, a visualization component as described with reference to FIGS. 1, 3, and 7.

Figure 9:
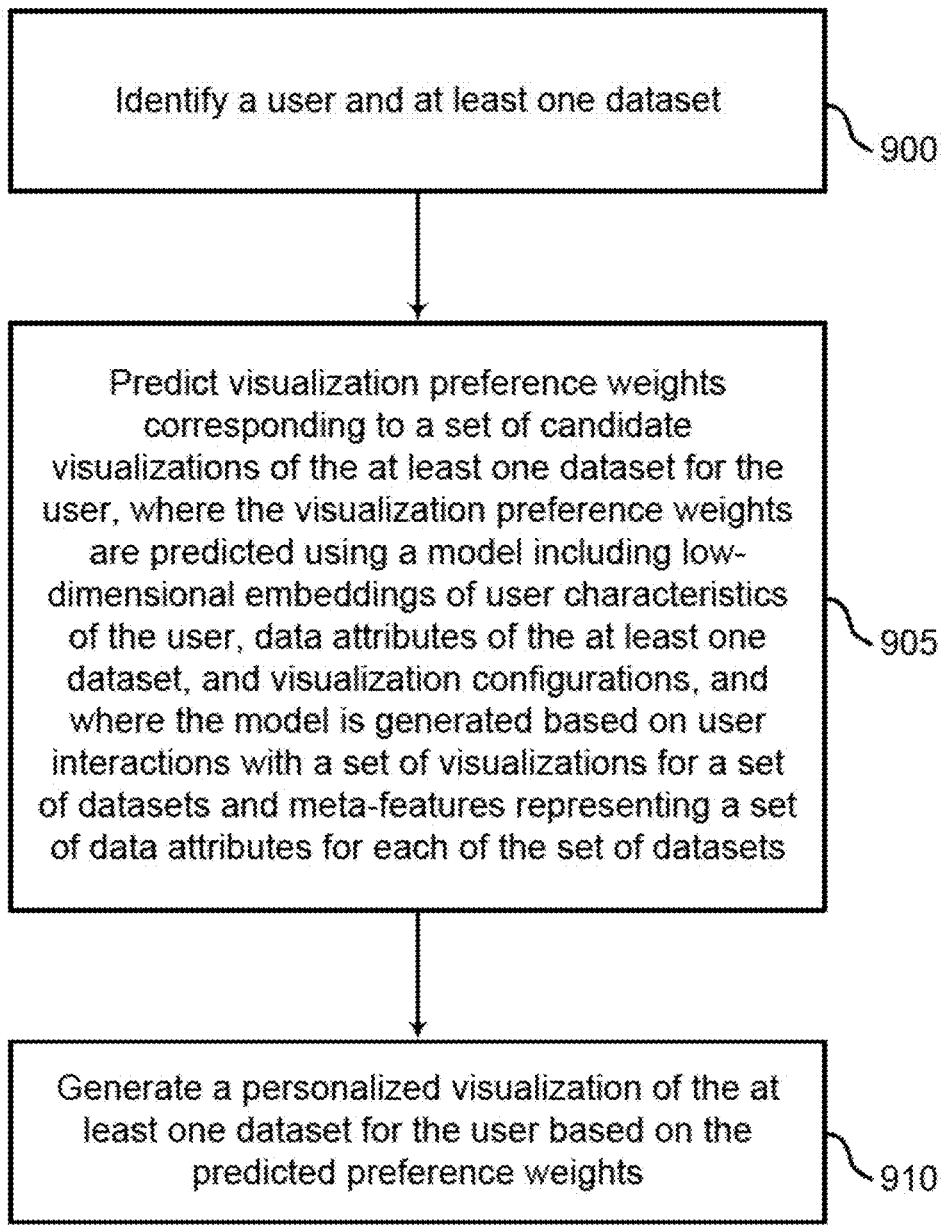
FIGS. 9 and 10 show examples of a process for data visualization according to aspects of the present disclosure.

FIG. 9 shows an example of a process for data visualization according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 900, the system identifies a user and at least one dataset. In some cases, users upload and explore their own respective dataset, while a few users use the same dataset. In another case, each user has her own dataset. The operations of this step refer to, or may be performed by, a preference component as described with reference to FIGS. 1, 3, and 7.

At operation 905, the system predicts visualization preference weights corresponding to a set of candidate visualizations of the at least one dataset for the user, where the visualization preference weights are predicted using a model including low-dimensional embeddings of user characteristics of the user, data attributes of the at least one dataset, and visualization configurations, and where the model is generated based on user interactions with a set of visualizations for a set of datasets and meta-features representing a set of data attributes for each of the set of datasets. In some cases, the operations of this step refer to, or may be performed by, a preference component as described with reference to FIGS. 1, 3, and 7.

According to an embodiment, a new user uploads or selects a new dataset that is not yet used before in the system or used by other users, and the visualization personalization system learns a joint factorization model based on data preference matrices and visualization preference matrices. The model predicts the preferences of the new user based on user preferences for variables that are similar to those in the new user and new dataset. Embodiments of the present disclosure are not limited to methods used herein such as joint matrix factorization or joint tensor factorization.

At operation 910, the system generates a personalized visualization (or visualization recommendation) for the at least one dataset for the user based on the predicted preference weights. The personalized visualization recommendation is displayed on the user device and may be selected by the user as a design choice. The user can choose to continue to work on the displayed personalized visualization to refine its configurations (e.g., through dragging, clicking, hovering, etc.). In some cases, the operations of this step refer to, or may be performed by, a visualization component as described with reference to FIGS. 1, 3, and 7.

Figure 10:
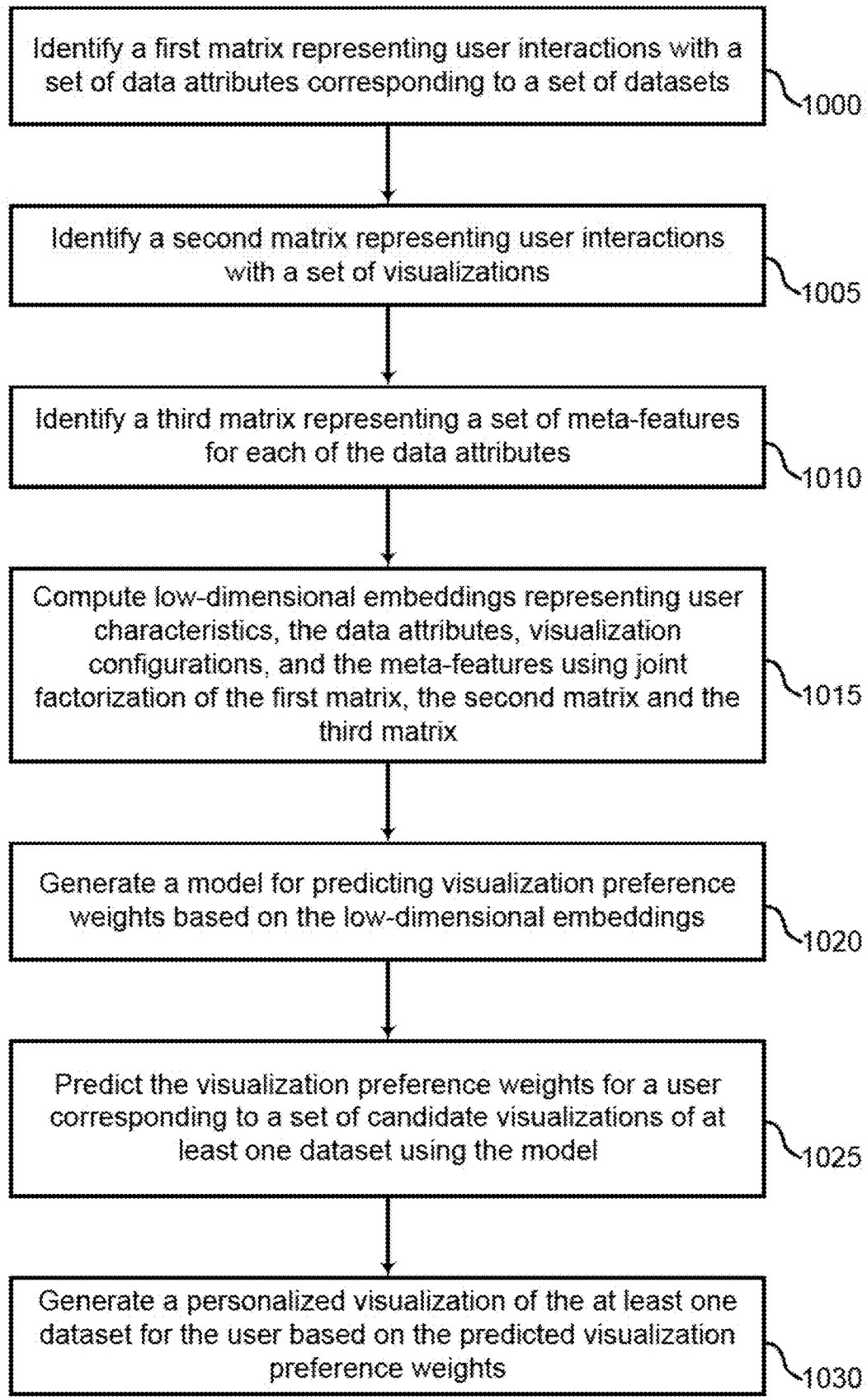

FIG. 10 shows an example of a process for data visualization according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1000, the system identifies a first matrix representing user interactions with a set of data attributes corresponding to a set of datasets. The first matrix includes a large user-by-variables matrix (denoted as matrix A) to derive the user preferences related to the variables users click on (and use in visualizations, etc.). In the first matrix, the variables are the variables from all the datasets that have been uploaded and used by users of the system. The (i,j) entry of matrix A denoted as $A_{i,j}$ is the number of times user i clicked on variable j. In some cases, the operations of this step refer to, or may be performed by, a data collection component as described with reference to FIGS. 1, 3, and 7.

At operation 1005, the system identifies a second matrix representing user interactions with a set of visualizations. According to an embodiment, the second matrix includes matrix C. The matrix C is a user by visualization configuration matrix where the (i,j) entry is the number of times a user clicked (or preferred) a visualization with that specific configuration. In some cases, the matrix C represents the number of times user i selected a visualization with variable j.

According to an embodiment, the system also creates another matrix or matrices representing the number of times user i added a visualization with variable j to their dashboard, or liked a visualization with variable j, etc. Embodiments of the present disclosure are not limited to the first and second matrices that encode different ways users preferred the different variables in the past interactions. In some cases, the operations of this step refer to, or may be performed by, a data collection component as described with reference to FIGS. 1, 3, and 7.

At operation 1010, the system identifies a third matrix representing a set of meta-features for each of the data attributes. The third matrix includes corresponding feature-by-variables matrix B. In the matrix B, the rows are the features of the variables and the columns are the variables from all the datasets that have been uploaded or selected and used by users of the system. The matrix B shares a common mode with the other variable-centric matrices.

These matrices share a mode, and hence the visualization personalization system of the present disclosure can collectively and simultaneously, learns a model that is able to correlate relations between variables (and visualizations) across multiple different datasets. In this way, the model makes recommendations based on these correlations and the user preferences of those variables and visualizations in other datasets, despite that users have preferences on different datasets. In some cases, the operations of this step refer to, or may be performed by, a meta-feature component as described with reference to FIG. 3.

At operation 1015, the system computes low-dimensional embeddings representing user characteristics, the data attributes, visualization configurations, and the meta-features using joint factorization of the first matrix, the second matrix and the third matrix. According to an embodiment, the system jointly models both user data preferences and user visualization preferences. Each preference matrix is input to the embedding component of the system, where the system learns low-dimensional embeddings for each preference matrix. The system includes multiple user data preference matrices and user visualization preference matrices. In some cases, the operations of this step refer to, or may be performed by, an embedding component as described with reference to FIGS. 1, 3, 6, and 7.

According to some embodiments, the system leverages any set of features that characterize the variables of interest, and/or leverages any embedding method to generate k-dimensional embeddings for the variables. In some cases, the dataset is known to the system (e.g., other users used the same dataset previously). The system stores the feature vectors for every column in the cache and retrieves them.

At operation 1020, the system generates a model for predicting visualization preference weights based on the low-dimensional embeddings. In some cases, the operations of this step refer to, or may be performed by, a preference component as described with reference to FIGS. 1, 3, and 7.

According to an embodiment, the visualization personalization system combines both types of preferences (i.e., user data preferences and user visualization preferences) to learn a model for making personalized visualization recommendations. The data preference matrices and the visualization preference matrices share common modes. For example, the visualization preference matrices share the user mode with other visualization preference matrices as well as the data preference matrices. In one embodiment, the system learns a user-by-user preference matrix. In some cases, it is computationally expensive to derive the complete user-by-user matrix. Instead, given a user of interest i, the system derives the most similar users from any of these matrices independently. In another embodiment, the system can learn a global model that jointly learns the user preferences. Both types of preference matrices are constructed from either implicit or explicit user feedback.

At operation 1025, the system predicts the visualization preference weights for a user corresponding to a set of candidate visualizations of at least one dataset using the model. According to an embodiment, the factor matrices are used by the system to make personalized visualization recommendations. For example, the user and visualization-configuration factor matrices are used to by the system to make personalized visualization recommendations to a user. In an embodiment, given an active user, a weighting of visualization configurations is obtained for the active user based on the user or visualization latent factor matrices. The system computes the low-dimensional embedding of user and the predicted visualization preferences vector for the user.

In some cases, the predicted visualization preferences vector includes weights representing the preference or likelihood that the active user would prefer each visualization configuration. The visualization personalization system returns the top-k best visualizations from the predicted visualization preferences vector. To locate the top-k best visualizations to recommend to the active user, a specialized priority queue data structure is used to compute the predicted visualization preferences vector for the active user. In some cases, the operations of this step refer to, or may be performed by, a visualization component as described with reference to FIGS. 1, 3, and 7.

At operation 1030, the system generates a personalized visualization (or visualization recommendation) for the at least one dataset for the user based on the predicted visualization preference weights. The personalized visualization is displayed on user device and would be preferred by the user. In some cases, the operations of this step refer to, or may be performed by, a visualization component as described with reference to FIGS. 1 and 3.

EXAMPLE EMBODIMENTS

Accordingly, the present disclosure includes at least the following embodiments.

A method for data visualization is described. Embodiments of the method are configured to identify a user and at least one dataset, predict visualization preference weights corresponding to a plurality of candidate visualizations of the at least one dataset for the user, wherein the visualization preference weights are predicted using a model comprising low-dimensional embeddings of user characteristics of the user, data attributes of the at least one dataset, and visualization configurations, and wherein the model is generated based on user interactions with a plurality of visualizations for a plurality of datasets and meta-features representing a plurality of data attributes for each of the plurality of datasets, and generate a personalized visualization (or visualization recommendation) for the at least one dataset for the user based on the predicted preference weights.

An apparatus for data visualization is described. The apparatus includes a processor, memory in electronic communication with the processor, and instructions stored in the memory. The instructions are operable to cause the processor to identify a user and at least one dataset, predict visualization preference weights corresponding to a plurality of candidate visualizations of the at least one dataset for the user, wherein the visualization preference weights are predicted using a model comprising low-dimensional embeddings of user characteristics of the user, data attributes of the at least one dataset, and visualization configurations, and wherein the model is generated based on user interactions with a plurality of visualizations for a plurality of datasets and meta-features representing a plurality of data attributes for each of the plurality of datasets, and generate a personalized visualization (or visualization recommendation) for the at least one dataset for the user based on the predicted preference weights.

A non-transitory computer readable medium storing code for data visualization is described. In some examples, the code comprises instructions executable by a processor to: identify a user and at least one dataset, predict visualization preference weights corresponding to a plurality of candidate visualizations of the at least one dataset for the user, wherein the visualization preference weights are predicted using a model comprising low-dimensional embeddings of user characteristics of the user, data attributes of the at least one dataset, and visualization configurations, and wherein the model is generated based on user interactions with a plurality of visualizations for a plurality of datasets and meta-features representing a plurality of data attributes for each of the plurality of datasets, and generate a personalized visualization (or visualization recommendation) for the at least one dataset for the user based on the predicted preference weights.

Some examples of the method, apparatus, and non-transitory computer readable medium described above further include generating first information and second information based on monitoring the user interactions, wherein the first information relates a plurality of users with the plurality of data attributes and the second information relates the plurality of users with the plurality of visualizations. Some examples further include generating third information by computing aggregate statistical properties of data corresponding to each of the data attributes, wherein the third information comprises the meta-features.

In some examples, the user interactions include at least one from a set comprising clicking on elements of the visualizations, hovering on elements of the visualizations, selection of chart types for the visualizations, utilization of data transformations for the plurality of datasets, and selection of colors for the visualizations. Some examples of the method, apparatus, and non-transitory computer readable medium described above further include performing joint matrix factorization on the first information, the second information, and the third information to learn the low-dimensional embeddings.

Some examples of the method, apparatus, and non-transitory computer readable medium described above further include performing joint tensor factorization on the first information, the second information, and the third information to learn the low-dimensional embeddings. Some examples of the method, apparatus, and non-transitory computer readable medium described above further include generating a list of recommended visualizations for the user based on the predicted preference weights. Some examples further include receiving a selection input from the user for selecting one of the recommended visualizations, wherein the personalized visualization recommendation is based on the selection input.

Some examples of the method, apparatus, and non-transitory computer readable medium described above further include displaying data from at least one of the plurality of datasets based on the personalized visualization recommendation. Some examples of the method, apparatus, and non-transitory computer readable medium described above further include performing unsupervised data clustering to generate one or more landmark features, wherein the meta-features include the landmark features.

Some examples of the method, apparatus, and non-transitory computer readable medium described above further include identifying an additional dataset comprising additional data attributes. Some examples further include updating the model based on the additional data attributes. Some examples further include generating an additional personalized visualization recommendation of the additional dataset based on the updated model.

Some examples of the method, apparatus, and non-transitory computer readable medium described above further include identifying an additional user. Some examples further include updating the model based on the additional user. Some examples further include generating an additional personalized visualization recommendation for the additional user based on the updated model.

Some examples of the method, apparatus, and non-transitory computer readable medium described above further include identifying additional user interactions. Some examples further include updating the model based on the additional user interactions. Some examples further include updating the personalized visualization recommendation based on the updated model.

Some examples of the method, apparatus, and non-transitory computer readable medium described above further include identifying a pre-determined number of data attributes. Some examples further include selecting a subset of the data attributes based on the pre-determined number, wherein the personalized visualization recommendation is based on the selected subset of data attributes.

A method for data visualization is described. Embodiments of the method are configured to identify a first matrix representing user interactions with a plurality of data attributes corresponding to a plurality of datasets, identify a second matrix representing user interactions with a plurality of visualizations, identify a third matrix representing a plurality of meta-features for each of the data attributes, compute low-dimensional embeddings representing user characteristics, the data attributes, visualization configurations, and the meta-features using joint factorization of the first matrix, the second matrix and the third matrix, generate a model for predicting visualization preference weights based on the low-dimensional embeddings, predict the visualization preference weights for a user corresponding to a plurality of candidate visualizations of at least one dataset using the model, and generate a personalized visualization (or visualization recommendation) for the at least one dataset for the user based on the predicted visualization preference weights.

An apparatus for data visualization is described. The apparatus includes a processor, memory in electronic communication with the processor, and instructions stored in the memory. The instructions are operable to cause the processor to identify a first matrix representing user interactions with a plurality of data attributes corresponding to a plurality of datasets, identify a second matrix representing user interactions with a plurality of visualizations, identify a third matrix representing a plurality of meta-features for each of the data attributes, compute low-dimensional embeddings representing user characteristics, the data attributes, visualization configurations, and the meta-features using joint factorization of the first matrix, the second matrix and the third matrix, generate a model for predicting visualization preference weights based on the low-dimensional embeddings, predict the visualization preference weights for a user corresponding to a plurality of candidate visualizations of at least one dataset using the model, and generate a personalized visualization (or visualization recommendation) for the at least one dataset for the user based on the predicted visualization preference weights.

A non-transitory computer readable medium storing code for data visualization is described. In some examples, the code comprises instructions executable by a processor to: identify a first matrix representing user interactions with a plurality of data attributes corresponding to a plurality of datasets, identify a second matrix representing user interactions with a plurality of visualizations, identify a third matrix representing a plurality of meta-features for each of the data attributes, compute low-dimensional embeddings representing user characteristics, the data attributes, visualization configurations, and the meta-features using joint factorization of the first matrix, the second matrix and the third matrix, generate a model for predicting visualization preference weights based on the low-dimensional embeddings, predict the visualization preference weights for a user corresponding to a plurality of candidate visualizations of at least one dataset using the model, and generate a personalized visualization (or visualization recommendation) for the at least one dataset for the user based on the predicted visualization preference weights.

In some examples, the low-dimensional embeddings comprise a fourth matrix representing the user characteristics, a fifth matrix representing the data attributes, a sixth matrix representing the visualization configurations, and a seventh matrix representing the meta-features. Some examples of the method, apparatus, and non-transitory computer readable medium described above further include performing a coordinate descent operation, wherein the low-dimensional embeddings are based on the coordinate descent operation.

Some examples of the method, apparatus, and non-transitory computer readable medium described above further include identifying at least one regularization term, wherein the low-dimensional embeddings are computed based on the at least one regularization term. Some examples of the method, apparatus, and non-transitory computer readable medium described above further include receiving an additional dataset comprising additional data attributes. Some examples further include updating the first matrix and the third matrix based on the additional data attributes. Some examples further include updating the low-dimensional embeddings based on the updated first matrix and the updated third matrix.

An apparatus for data visualization is described. Embodiments of the apparatus include a data collection component configured to obtain first information representing user interactions with a plurality of data attributes for each of a plurality of datasets, second information representing user interactions with a plurality of visualizations of the plurality of datasets, and third information representing a plurality of meta-features for each of the data attributes, an embedding component configured to compute low-dimensional embeddings of user characteristics, the data attributes, and visualization configurations based on the first information, the second information and the third information, and a preference component configured to predict visualization preference weights for personalized visualizations based on the low-dimensional embeddings.

A method of providing an apparatus for data visualization is described. The method includes a data collection component configured to obtain first information representing user interactions with a plurality of data attributes for each of a plurality of datasets, second information representing user interactions with a plurality of visualizations of the plurality of datasets, and third information representing a plurality of meta-features for each of the data attributes, an embedding component configured to compute low-dimensional embeddings of user characteristics, the data attributes, and visualization configurations based on the first information, the second information and the third information, and a preference component configured to predict visualization preference weights for personalized visualizations based on the low-dimensional embeddings.

Some examples of the apparatus and method described above further include a visualization component configured to generate the personalized visualizations based on the predicted visualization preference weights. In some examples, the data collection component is configured to monitor the user interactions with the plurality of data attributes for each of the plurality of datasets and the user interactions with the plurality of visualizations of the plurality of datasets.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine.

A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for data visualization, comprising:
generating a user visualization interaction matrix by identifying a plurality of data attributes of a plurality of datasets and user interactions with a plurality of visualizations for the plurality of datasets;
generating a meta-feature matrix by mapping the plurality of data attributes to a plurality of meta-features;
generating a user data interaction matrix by identifying user characteristics of a user and data attributes of at least one dataset;
performing joint factorization of the user visualization interaction matrix, the meta-feature matrix, and the user data interaction matrix based on the user interactions and the mapping to obtain a plurality of joint factorization matrices comprising low-dimensional embeddings of the user characteristics of the user and the data attributes of the at least one dataset, wherein a first joint factorization matrix of the plurality of joint factorization matrices represents a first factor of the user data interaction matrix and a factor of the user visualization interaction matrix, a second joint factorization matrix of the plurality of joint factorization matrices represents a second factor of the user data interaction matrix and a factor of the meta-feature matrix;
predicting visualization preference weights corresponding to a plurality of candidate visualizations of the at least one dataset for the user using a model based on the plurality of joint factorization matrices; and
generating a personalized visualization recommendation for the at least one dataset for the user based on the predicted visualization preference weights.

2. The method of claim 1, further comprising: generating first information and second information based on monitoring the user interactions, wherein the first information relates a plurality of users with the plurality of data attributes and the second information relates the plurality of users with the plurality of visualizations; and generating third information by computing aggregate statistical properties of data corresponding to each of the data attributes, wherein the third information comprises the plurality of meta-features.

3. The method of claim 1, wherein: the model is generated based on the user interactions with the plurality of visualizations of the plurality of datasets and the plurality of meta-features representing the plurality of data attributes for each of the plurality of datasets, and wherein the user interactions include at least one from a set comprising clicking on elements of the visualizations, hovering on elements of the visualizations, selection of chart types for the visualizations, utilization of data transformations for the plurality of datasets, and selection of colors for the visualizations.

4. The method of claim 2, further comprising: performing joint matrix factorization on the first information, the second information, and the third information to learn the low-dimensional embeddings.

5. The method of claim 2, further comprising: performing joint tensor factorization on the first information, the second information, and the third information to learn the low-dimensional embeddings.

6. The method of claim 1, further comprising: generating a list of recommended visualizations for the user based on the predicted visualization preference weights; and receiving a selection input from the user for selecting one of the recommended visualizations, wherein the personalized visualization recommendation is based on the selection input.

7. The method of claim 1, further comprising: displaying data from at least one of the plurality of datasets based on the personalized visualization recommendation.

8. The method of claim 1, further comprising: performing unsupervised data clustering to generate one or more landmark features, wherein the plurality of meta-features includes the one or more landmark features.

9. The method of claim 1, further comprising: identifying an additional dataset comprising additional data attributes; updating the model based on the additional data attributes; and generating an additional personalized visualization recommendation of the additional dataset based on the updated model.

10. The method of claim 1, further comprising: identifying an additional user; updating the model based on the additional user; and generating an additional personalized visualization recommendation for the additional user based on the updated model.

11. The method of claim 1, further comprising: identifying additional user interactions; updating the model based on the additional user interactions; and updating the personalized visualization recommendation based on the updated model.

12. The method of claim 1, further comprising: identifying a pre-determined number of data attributes; and selecting a subset of the data attributes based on the pre-determined number, wherein the personalized visualization recommendation is based on the selected subset of data attributes.

13. A method for data visualization, comprising: identifying a first matrix that relates a plurality of users with a plurality of data attributes of a plurality of datasets; identifying a second matrix representing user interactions with a plurality of visualizations; identifying a third matrix representing a plurality of meta-features for each of the data attributes; performing joint factorization of the first matrix, the second matrix, and the third matrix to obtain a plurality of joint factorization matrices, wherein a first joint factorization matrix of the plurality of joint factorization matrices represents a first factor of the first matrix and a factor of the second matrix, a second joint factorization matrix of the plurality of joint factorization matrices represents a second factor of the first matrix and a factor of the third matrix; generating a model for predicting visualization preference weights based on the plurality of joint factorization matrices; predicting the visualization preference weights for a user corresponding to a plurality of candidate visualizations of at least one dataset using the model; and generating a personalized visualization (or visualization recommendation) for the at least one dataset for the user based on the predicted visualization preference weights.

14. The method of claim 13, further comprising: computing low-dimensional embeddings representing user characteristics, the data attributes, visualization configurations, and the meta-features using joint factorization of the first matrix, the second matrix and the third matrix, wherein the low-dimensional embeddings comprise a fourth matrix representing the user characteristics, a fifth matrix representing the data attributes, a sixth matrix representing the visualization configurations, and a seventh matrix representing the meta-features.

15. The method of claim 14, further comprising: performing a coordinate descent operation, wherein the low-dimensional embeddings are based on the coordinate descent operation.

16. The method of claim 14, further comprising: identifying at least one regularization term, wherein the low-dimensional embeddings are computed based on the at least one regularization term.

17. The method of claim 14, further comprising: receiving an additional dataset comprising additional data attributes; updating the first matrix and the third matrix based on the additional data attributes; and updating the low-dimensional embeddings based on the updated first matrix and the updated third matrix.

18. An apparatus for data visualization, comprising:
a data collection component configured to generate a user visualization interaction matrix by identifying a plurality of data attributes of a plurality of datasets and user interactions with a plurality of visualizations for the plurality of datasets, to generate a meta-feature matrix by mapping the plurality of data attributes to a plurality of meta-features to obtain a matrix of meta-features, and to generate a user data interaction matrix by identifying user characteristics of a user and data attributes of at least one dataset;
an embedding component configured to perform joint factorization of the user visualization interaction matrix, the meta-feature matrix, and the user data interaction matrix based on the user interactions and the mapping to obtain a plurality of joint factorization matrices comprising low-dimensional embeddings of the user characteristics of the user and the data attributes of the at least one dataset, wherein a first joint factorization matrix of the plurality of joint factorization matrices represents a first factor of the user data interaction matrix and a factor of the user visualization interaction matrix, a second joint factorization matrix of the plurality of joint factorization matrices represents a second factor of the user data interaction matrix and a factor of the meta-feature matrix;
a preference component configured to predict visualization preference weights for personalized visualizations based on the low-dimensional embeddings; and a visualization component configured to generate the personalized visualizations based on the predicted visualization preference weights.

19. The apparatus of claim 18, wherein: the data collection component is configured to monitor the user interactions with the plurality of data attributes for each of the plurality of datasets and the user interactions with the plurality of visualizations of the plurality of datasets.

\* \* \* \* \*